(12) United States Patent
Morishita

(10) Patent No.: US 8,898,671 B2
(45) Date of Patent: Nov. 25, 2014

(54) PROCESSOR THAT EXECUTES A PLURALITY OF THREADS BY PROMOTING EFFICIENCY OF TRANSFER OF DATA THAT IS SHARED WITH THE PLURALITY OF THREADS

(75) Inventor: Hiroyuki Morishita, Osaka (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 13/393,967

(22) PCT Filed: Jul. 6, 2011

(86) PCT No.: PCT/JP2011/003861
§ 371 (c)(1),
(2), (4) Date: Mar. 2, 2012

(87) PCT Pub. No.: WO2012/004990
PCT Pub. Date: Jan. 12, 2012

(65) Prior Publication Data
US 2012/0167114 A1 Jun. 28, 2012

(30) Foreign Application Priority Data
Jul. 7, 2010 (JP) .................................. 2010-154629

(51) Int. Cl.
*G06F 9/46* (2006.01)
*G06F 9/26* (2006.01)
(Continued)

(52) U.S. Cl.
CPC ............ *G06F 9/3009* (2013.01); *G06F 9/4812* (2013.01); *G06F 9/3851* (2013.01); *G06F 9/4843* (2013.01)
USPC ........... 718/102; 718/106; 718/100; 711/169; 711/163; 711/168; 711/203; 710/200; 707/704

(58) Field of Classification Search
None
See application file for complete search history.

(56) References Cited

U.S. PATENT DOCUMENTS 7,885,334 B2 * 2/2011 Muller et al. ............ 375/240.24
8,176,022 B1 * 5/2012 Garcia ........................... 707/704
(Continued)

FOREIGN PATENT DOCUMENTS

JP   2003-29987    1/2003
JP   2003-323415   11/2003
(Continued)

OTHER PUBLICATIONS

International Search Report issued Sep. 27, 2011 in corresponding International Application No. PCT/JP2011/003861.

(Continued)

*Primary Examiner* — Meng An
*Assistant Examiner* — Bing Zhao
(74) *Attorney, Agent, or Firm* — Wenderoth, Lind & Ponack, L.L.P.

(57) ABSTRACT

Provide is a processor that can maintain a dependency relationship between a plurality of instructions and one read instruction. The processor comprises: a setting unit configured to set, when an instruction that exists at a location ensuring that writing into a memory area has been completed is executed, usage information indicating whether writing into the memory area has been completed such that the usage information indicates that writing into a memory area during execution of one thread has been completed; and a control unit configured to (i) perform execution of a read instruction to read data stored in the memory area when the usage information indicates that writing into the memory area during execution of the one thread has been completed, and (ii) suppress execution of the read instruction when the usage information indicates that writing into the memory area during execution of the one thread has not been completed.

11 Claims, 13 Drawing Sheets

(51) Int. Cl.
*G06F 13/00* (2006.01)
*G06F 12/00* (2006.01)
*G06F 7/00* (2006.01)
*G06F 9/48* (2006.01)
*G06F 9/38* (2006.01)
*G06F 9/30* (2006.01)

(56) References Cited

U.S. PATENT DOCUMENTS

| | | |
|---|---|---|
| 2003/0014472 A1 | 1/2003 | Ohsawa et al. |
| 2003/0126186 A1 | 7/2003 | Rodgers et al. |
| 2004/0148475 A1 | 7/2004 | Ogasawara |
| 2004/0267996 A1 | 12/2004 | Hammarlund et al. |
| 2007/0162774 A1 | 7/2007 | Hammarlund et al. |
| 2008/0022141 A1 | 1/2008 | Hammarlund et al. |
| 2008/0034190 A1 | 2/2008 | Rodgers et al. |

FOREIGN PATENT DOCUMENTS

| | | |
|---|---|---|
| JP | 2006-500639 | 1/2006 |
| JP | 2007-520769 | 7/2007 |
| JP | 2008-165834 | 7/2008 |

OTHER PUBLICATIONS

John L. Hennessy et al., "Computer Architecture: A Quantitative Approach, 4$^{th}$ Edition", Shoeisha Co., Ltd., Sep. 2006, pp. 185-192, (ISBN 978-4-7981-1440-8) (with English translation).

John Paul Shen et al., "Modern Processor Design", McGraw-Hill, Series in Electrical and Computer Engineering, Jul. 2004, pp. 142-145, (ISBN0-07-057064).

\* cited by examiner

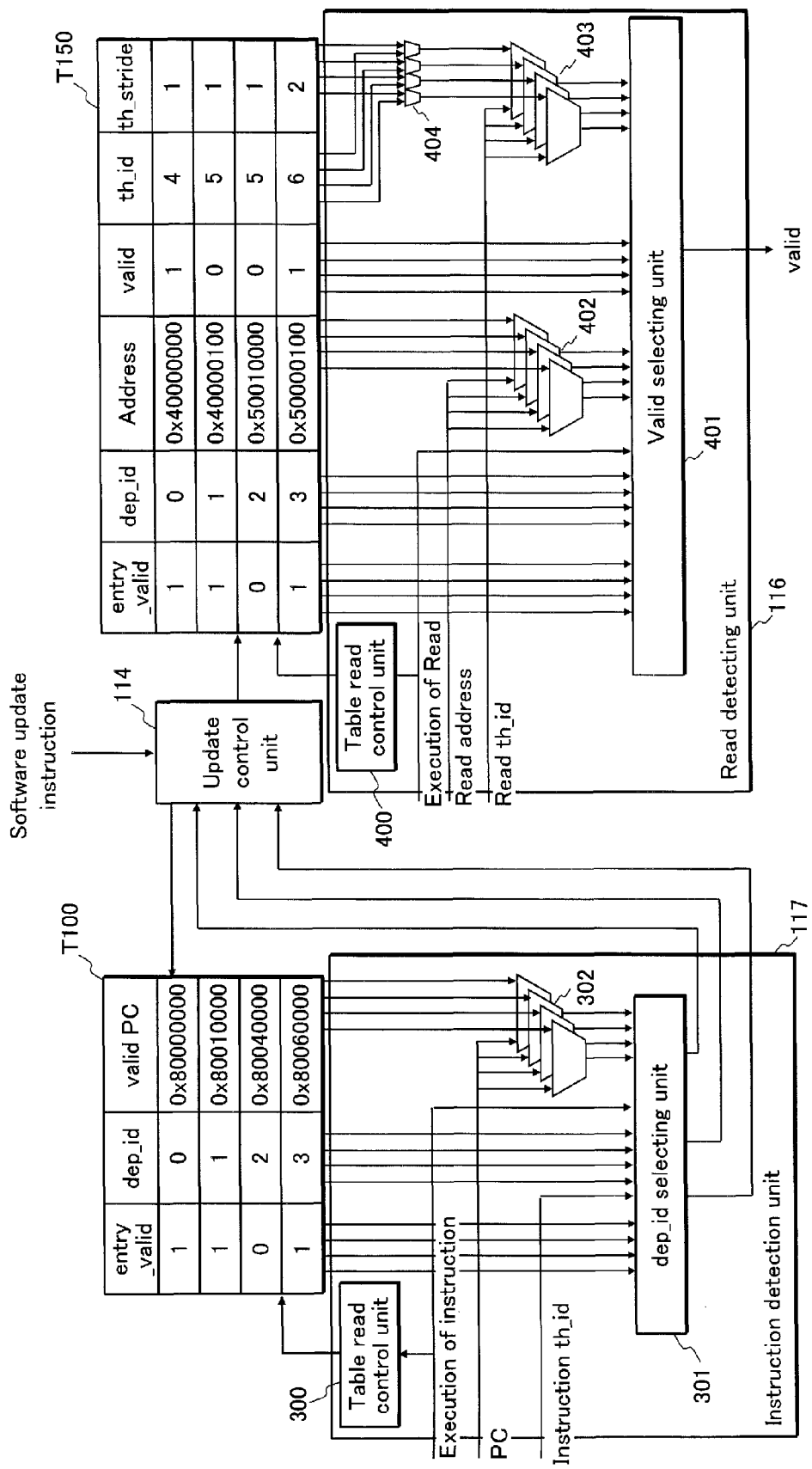

PROCESSOR THAT EXECUTES A PLURALITY OF THREADS BY PROMOTING EFFICIENCY OF TRANSFER OF DATA THAT IS SHARED WITH THE PLURALITY OF THREADS

TECHNICAL FIELD

The present invention relates to a technology for improving operating efficiency of a processor capable of executing a plurality of threads at the same time, by promoting efficiency of transfer of data that is shared with the plurality of threads.

BACKGROUND ART

Media processing that, for example, compresses and decompresses digitalized video data, audio data and the like, has a large amount of operation. Therefore, special-purpose hardware, a high-performance digital signal processor (DSP) and the like for media processing have become popular.

Among some kinds of media processing as above, a great variety of standards such as moving picture experts group 2 (MPEG-2), MPEG-4, H.263, and H.264 have been put into practical use. Accordingly, digital audio-visual (AV) equipment is required to support media processing of a plurality of standards. In addition, complexity of each of media processing applications is increasing, and the size of an image, the number of channels of audio and the like are also increasing. Accordingly, the amount of operation continues increasing.

Therefore, an attempt is made to improve performance by using a high-performance multi-thread processor (for example, see Non-Patent Literature 1). Such a processor executes a plurality of programs at the same time, and accordingly operating efficiency thereof has been greatly improved.

When a multi-thread processor executes a plurality of threads (programs) at the same time, one thread and at least one other thread often have a dependency relationship, and for example, after a predetermined write instruction to write data is executed during execution of the one thread, a read instruction to read the data written by the predetermined write instruction is executed during execution of the another thread.

Such a case is implemented by a technology disclosed in Patent Literature 1.

According to Patent Literature 1, the dependency relationship between one thread and at least one other thread is implemented by managing an address in a memory area. To be specific, according to the technology disclosed in Patent Literature 1, when a write instruction is executed during execution of the one thread with respect to the managed address, the other thread can access an area indicated by the address, i.e., reading can be performed in the area during execution of the other thread.

CITATION LIST

Patent Literature

Patent Literature 1

Japanese Unexamined Patent Application Publication No. 2006-500639

Non-Patent Literature

Non-Patent Literature 1

"Computer Architecture: A Quantitative Approach, 4th Edition", by John L. Hennessy and David A. Patterson, Shoeisha Co., Ltd., pp. 185-192 (ISBN 978-4-7981-1440-8)

SUMMARY OF INVENTION

Technical Problem

The technology described above is effective when the dependency relationship relates to one write instruction. However, the technology does not support a case where, with respect to a memory area indicated by one address, a read instruction is executed in the memory area after a plurality of write instructions are executed. Since a target for management is an address, after the initial write instruction is executed, the read instruction to read the memory area indicated by the same address is executed during execution of another thread. Therefore, the dependency relationship for executing the read instruction after execution of the plurality of write instructions is not maintained.

The present invention aims to provide a processor and a method for maintaining a dependency relationship between a plurality of write instructions and one read instruction.

Solution to Problem

In order to achieve the above aim, the present invention provides a processor that executes a plurality of threads, comprising: a setting unit configured to set, when an instruction that exists at a location ensuring that writing into a memory area has been completed is executed, usage information indicating whether or not writing into the memory area has been completed such that the usage information indicates that writing into the memory area during execution of one thread has been completed, the memory area being shared among the one thread and another thread, the instruction being included in the one thread; and a control unit configured to (i) perform execution of a read instruction included in said another thread to read data stored in the memory area when the usage information indicates that writing into the memory area during execution of the one thread has been completed, and (ii) suppress execution of the read instruction when the usage information indicates that writing into the memory area during execution of the one thread has not been completed.

Advantageous Effects of Invention

According to the above structure, the processor reads the data stored in the memory area during execution of the said another thread by executing the instruction that exists at the location ensuring that writing into the memory area shared with said another thread during execution of the one thread has been completed. That is, after the processor ensures that instructions that exist up to the instruction that exists at the location have been executed, the processor can read the data stored in the memory area during execution of the said another thread. Thereby, the processor can maintain a dependency relationship for executing a read instruction after a plurality of write instructions have been executed, for example.

BRIEF DESCRIPTION OF DRAWINGS

FIG. 3 shows structures of a read detection unit 116 and an instruction detection unit 117.

DESCRIPTION OF EMBODIMENTS

1. Embodiment 1

Embodiment 1 of the present invention is described below with reference to the drawings.

1.1 Structure

Figure 1:
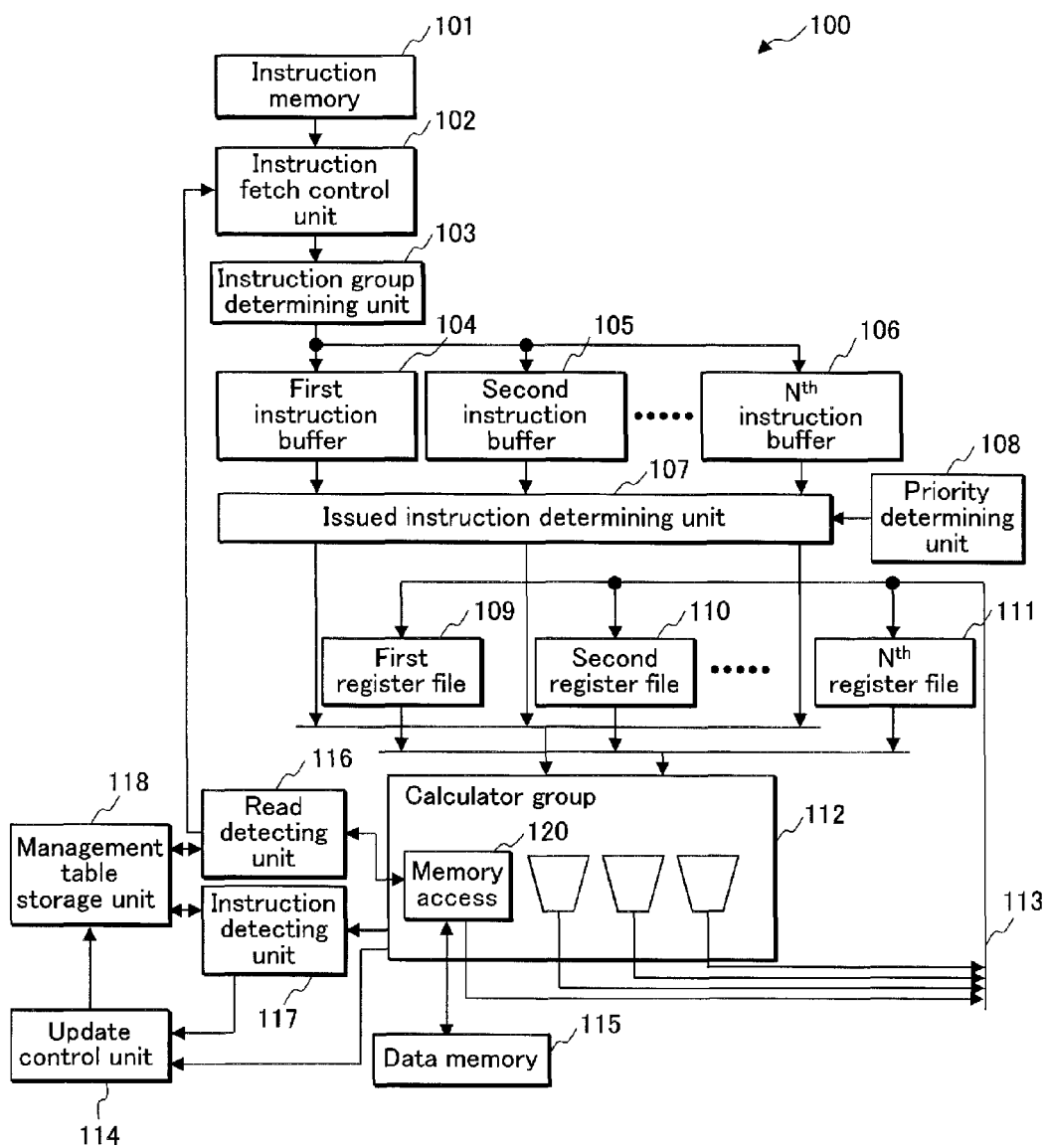
FIG. 1 shows a structure of a multi-thread processor 100.

FIG. 1 is a block diagram showing a structure of a multi-thread processor 100 pertaining to Embodiment 1.

The multi-thread processor 100 independently executes N (where N is an integer equal to or greater than two) instruction streams (N threads) at the same time, and includes an instruction memory 101, an instruction fetch control unit 102, an instruction group determining unit 103, N instruction buffers (a first instruction buffer 104, a second instruction buffer 105, ..., an $N^{th}$ instruction buffer 106), an issued instruction determining unit 107, a priority determining unit 108, N register files (a first register file 109, a second register file 110, ..., an $N^{th}$ register file 111), a calculator group 112, a write back bus 113, an update control unit 114, a data memory 115, a read detecting unit 116, an instruction detecting unit 117, and a management table storage unit 118.

Here, the instruction buffers and the register files are in one-to-one correspondence, and constitute N logic processors.

(1) Instruction Memory 101

The instruction memory 101 stores therein an instruction to be executed by the multi-thread processor, and stores therein N instruction streams (threads) to be independently executed.

(2) Instruction Fetch Control Unit 102

The instruction fetch control unit 102 stores therein a program counter (PC) of each thread, and reads an instruction to be executed next from the instruction memory. Here, a PC of each thread is counted in a range including values different from values included in other ranges.

In addition, on acquiring, from the read detecting unit 116, a Read access signal indicating whether or not instructions are continued to be fetched, the instruction fetch control unit 102 continues fetching instructions or activates branch processing for branching to a special processing vector that corresponds to an exception occurrence, in accordance with a value of the acquired signal. To be specific, when the value of acquired signal is 1, the instruction fetch control unit 102 stops an instruction execution sequence that has been executed, and activates branch processing for branching to the special processing vector that corresponds to an exception occurrence. When the value of acquired signal is 0, the instruction execution sequence is continued.

(3) Instruction Group Determining Unit 103

The instruction group determining unit 103 reads an instruction that belongs to each instruction stream from the instruction memory 101, decodes the read instruction, and writes the decoded instruction in one of the instruction buffers that the instruction is assigned.

(4) First Instruction Buffer 104 through $N^{th}$ Instruction Buffer 106

An $i^{th}$ instruction buffer (i being an integer between one and N, inclusive) acquires an instruction that belongs to an $i^{th}$ instruction stream and stores therein the acquired instruction.

(5) Issued Instruction Determining Unit 107

The issued instruction determining unit 107 determines instructions that are issued from the N instruction buffers for respective machine cycles.

(6) Priority Determining Unit 108

The priority determining unit 108 stores therein a priority information table that is used when instructions issued by the issued instruction determining unit 107 are determined.

At that time, the issued instruction determining unit 107 determines the instructions that are issued for respective machine cycles with use of the priority information table stored in the priority determining unit 108.

(7) First Register File 109 through $N^{th}$ Register File 111

An $i^{th}$ register file (i being an integer between one and N, inclusive) is a register that stores therein data that is targeted for reading and writing when an instruction stream stored in the $i^{th}$ instruction buffer is executed.

The calculator group 112 includes a memory access 120, as shown in FIG. 1.

Here, the memory access 120 is a calculator for executing an instruction to access a data memory.

(9) Write Back Bus 113

The write back bus 113 writes output from the calculator group 112 back to the first register file 109 through the $N^{th}$ register file 111.

(10) Data Memory 115

The data memory 115 is accessed by using the instruction to access the data memory, and stores therein data used when a program is executed.

(11) Management Table Storage Unit 118

Figure 2A:
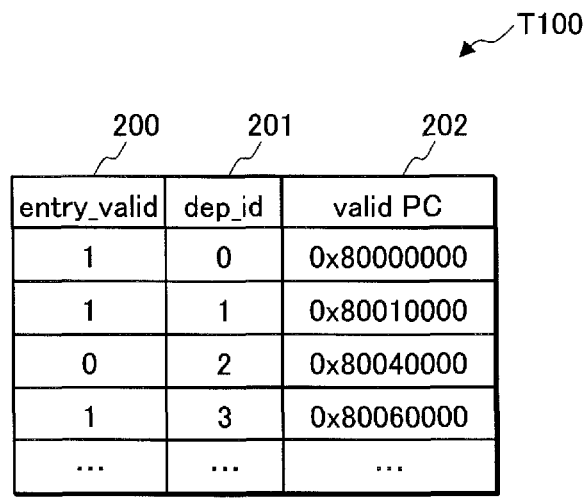
FIG. 2A shows an example of a data structure of an access management table T100.
Figure 2B:
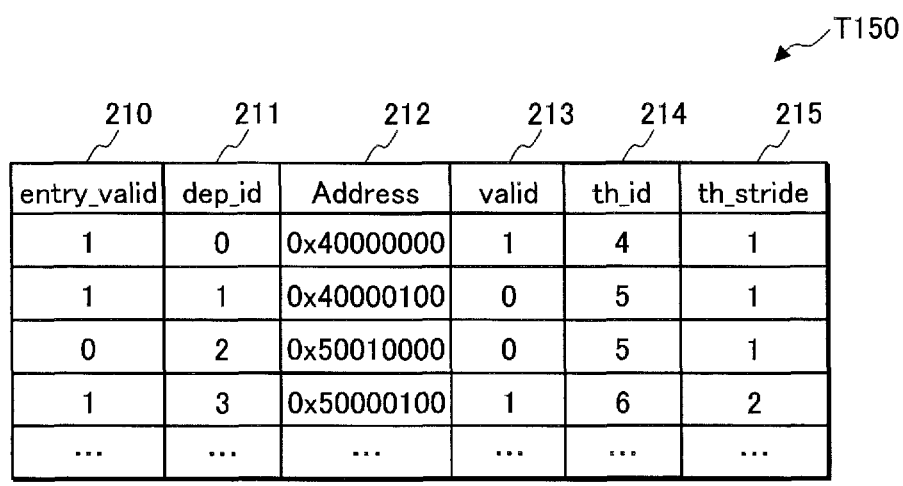
FIG. 2B shows an example of a data structure of a Read access management table T150.

The management table storage unit 118 stores therein an access management table T100 and a Read access management table T150 that are shown in FIGS. 2A and 2B, respectively.

(11-1) Access Management Table T100

The access management table T100 includes an area for storing a plurality of sets each composed of values of entry_valid 200, dep_id 201, and valid PC 202, as shown in FIG. 2A.

A value of the entry_valid 200 indicates whether a set (entry) including the value is valid information or not. For example, the value "0" of the entry_valid 200 set to an entry indicates that the entry is invalid, and the value "1" of the entry_valid 200 set to an entry indicates that the entry is valid.

A value of the dep_id 201 is information for associating an entry including the value with an entry in the Read access management table T150.

The Read access management table T150 includes an area for storing a plurality of sets each composed of values of entry_valid 210, dep_id 211, Address 212, valid 213, th_id 214, and th_stride 215.

A value of the entry_valid 210 indicates whether a set (entry) including the value is valid information or not. For example, the value "0" of the entry_valid 210 set to an entry indicates that the entry is invalid, and the value "1" of the entry_valid 210 set to an entry indicates that the entry is valid, in the same manner as the entry_valid 200.

A value of the dep_id 211 is information for associating an entry including the value with an entry in the Read access management table T100. Here, an entry whose value of the dep_id 201 is the same as a value of the dep_id 211 is associated with an entry including the above value of the dep_id 211.

A value of the Address 212 indicates a starting address of a memory area managed by an entry including the value.

A value of the valid 213 indicates whether or not writing into the memory area managed by an entry including the value during execution of any thread has been completed.

A value of the th_id 214 indicates the number of the thread during which writing into the memory area managed by an entry including the value has been completed.

A value of th_stride 215 indicates a distance between a thread during execution of which writing into the memory area managed by an entry including the value has been completed and a thread during execution of which reading is performed.

(12) Update Control Unit 114

The update control unit 114 updates the access management table T100 and the Read access management table T150.

(12-1) Regarding Access Management Table T100

On acquiring a software update instruction from software, the update control unit 114 updates fields in the access management table T100. Each field is readable and writable by software.

For example, on acquiring a software update instruction before processing of software that operates with use of N threads starts, the update control unit 114 records a plurality of entries of the software that are to be managed by the access management table T100.

(12-2) Regarding Read Access Management Table T150

On acquiring a software update instruction from software in the same manner as when the access management table T100 is updated, the update control unit 114 updates fields in the Read access management table T150. Each field is readable and writable by software.

For example, on acquiring a software update instruction before processing of software that operates with use of N threads starts, the update control unit 114 records a plurality of entries of the software that are to be managed by the Read access management table T150.

In addition, on acquiring instruction detection information from the instruction detecting unit 117, the update control unit 114 updates fields in the Read access management table T150. Here, the instruction detection information includes (i) information indicating that an instruction that triggers update of the access management table T100 (hereinafter, instruction detection signal) is detected, (ii) a value of the dep_id included in an entry targeted to be updated (hereinafter, instruction dep_id), and (iii) a value of instruction th_id. Here, the value of the instruction th_id is the thread number of a program and is output from the calculator group 112 when a certain instruction is executed. The certain instruction belongs to the program.

For example, on acquiring the instruction detection information from the instruction detecting unit 117, the update control unit 114 changes a value of the valid to "1", the value of the valid being included in an entry including a value of the dep_id that matches the value of the instruction dep_id included in the acquired instruction detection information.

The update control unit 114 further changes a value of the th_id of the entry to the value of the instruction th_id included in the acquired instruction detection information.

Furthermore, when a read instruction to read a memory area whose value of the valid is "1" is executed during execution of a certain thread, the update control unit 114 updates the value of the valid from "1" to "0".

(13) Instruction Detecting Unit 117

When an instruction is executed, the instruction detecting unit 117 detects whether or not a value of a PC of the instruction is managed by the access management table T100 stored in the management table storage unit 118. That is, the instruction detecting unit detects whether or not writing performed in a certain memory area has been completed.

The instruction detecting unit 117 includes a table read control unit 300, a dep_id selecting unit 301, and a PC comparing unit 302, as shown in FIG. 3.

On acquiring an instruction execution signal from the calculator group 112 when a certain instruction is executed, the table read control unit 300 starts reading an entry of the access management table T100.

The PC comparing unit 302 judges whether or not a value of the valid PC included in the read entry of the access management table T100 matches a value of a PC output from the calculator group 112 when the certain instruction is executed, and outputs the result to the dep_id selecting unit 301.

The dep_id selecting unit 301 acquires values of the entry_valid and the dep_id that have been read from the table read control unit 300.

Also, the dep_id selecting unit 301 receives the result of judgment performed by the PC comparing unit 302.

Furthermore, the dep_id selecting unit 301 also acquires an instruction execution signal, the value of the PC, and a value of instruction th_id from the calculator group 112 when the certain instruction is executed.

Based on the result of judgment performed by the PC comparing unit 302, when a value of a PC of the executed instruction is a value of a PC of an instruction to be detected, the dep_id selecting unit 301 outputs instruction detection information to the update control unit 114. The instruction detection information includes the value of the instruction th_id that has been acquired in accordance with the value of the PC, the acquired value of the dep_id (hereinafter, instruction dep_id), and an instruction detection signal.

(14) Read Detecting Unit 116

When an instruction to access the data memory is executed, the read detecting unit 116 detects whether or not an access target address of the instruction is in a memory area managed by the Read access management table T150 stored in the management table storage unit 118.

The read detecting unit 116 includes a table read control unit 400, a valid selecting unit 401, a Read address comparing unit 402, a th_id comparing unit 403, and an adder 404, as shown in FIG. 3.

On acquiring a Read execution signal from the memory access 120 when a Read instruction to access the data memory 115 for performing reading is executed in the memory access 120, the table read control unit 400 starts reading an entry of the Read access management table T150.

The Read address comparing unit 402 compares a value of the Address in the Read access management table T150 with a value of a Read address output from the memory access 120, and outputs the result of comparison to the valid selecting unit 401. Here, a Read address is an address of a data memory targeted for access and reading, and is output from the memory access 120 when the instruction to access the data memory 115 for performing reading is executed in the memory access 120.

The adder 404 calculates the sum of the value of th_id and the value of th_stride that have been read, and outputs the result of calculation to the th_id comparing unit 403.

The th_id comparing unit 403 compares a value of the Read th_id output from the memory access 120 and a value acquired from the adder 404 (sum of the value of th_id and the value of th_stride that have been read), and outputs the result of comparison to the valid selecting unit 401. Here, a value of Read th_id is the thread number of a thread to which the instruction to access the data memory 115 for performing reading belongs, and is output from the memory access 120 when the instruction to access the data memory 115 for performing reading is executed in the memory access 120.

The valid selecting unit 401 acquires a Read execution signal from the memory access 120.

The valid selecting unit 401 acquires values of entry_valid, dep_id, and valid that have been read from the table read control unit 400.

Furthermore, the valid selecting unit 401 acquires each of the result of comparison performed by the Read address comparing unit 402 and the result of comparison performed by the th_id comparing unit 403.

If a Read address is an address to be detected according to the result of comparison performed by the Read address comparing unit 402 and the result of comparison performed by the th_id comparing unit 403, the valid selecting unit 401 outputs, to the memory access 120, the value of the valid that has been acquired in accordance with the Read address.

1.2 Operations

Here, operations of the multi-thread processor 100 are described.

(1) Operations When Instruction is Detected

First, operations performed by the instruction detecting unit 117 when an instruction is executed are described with reference to a flowchart shown in FIG. 4. Note that the operations start when the instruction detecting unit 117 acquires an instruction execution signal corresponding to the instruction, a PC, and an instruction th_id from the calculator group 112.

When the instruction is executed, the table read control unit 300 initializes a counter n to 0, the counter n being used for control to read an entry from the access management table T100 (step S5). Here, the counter n is stored in the table read control unit 300.

The PC comparing unit 302 acquires a value of the valid PC included in the $n^{th}$ entry from the access management table T100 (step S10), and judges whether or not the acquired value of the valid PC matches a value of the PC that has been acquired from the calculator group 112 (step S15).

When the PC comparing unit 302 judges that the value of the valid PC matches the value of the PC acquired from the calculator group 112 ("Yes" in step S15), the dep_id selecting unit 301 acquires a value of the entry_valid included in the $n^{th}$ entry (step S20). Here, when the result of judgment in step S15 is affirmative, it means that instructions up to an instruction indicated by the PC managed in the access management table T100 have been executed, i.e., completion of writing performed in a certain memory area is detected.

The dep_id selecting unit 301 judges whether or not the value of the acquired entry_valid is "1" (step S25).

When the result of judgment is "1" ("Yes" in step S25), the dep_id selecting unit 301 acquires a value of the dep_id included in the $n^{th}$ entry from the access management table T100 (step S30).

The dep_id selecting unit 301 outputs the acquired value of the dep_id (instruction dep_id), a value of th_id (instruction th_id) corresponding to a thread that includes the executed instruction, and an instruction detection signal to the update control unit 114 (step S35).

When the result of judgment performed by the dep_id selecting unit 301 is not "1" ("No" in step S25), the table read control unit 300 increments a value of counter n (step S40). The table read control unit 300 acquires the last number of the entry registered in the access management table T100 from a last entry register (step S45). Subsequently, the table read control unit 300 judges whether or not the value of counter n matches the last number of the entry or not (step S50). If the result of judgment is affirmative, the processing ends ("Yes" in step S50), and if the result of judgment is negative, the processing returns to step S10 ("No" in step S50).

(2) Regarding Update Operations of Read Access Management Table T150

Figure 5:
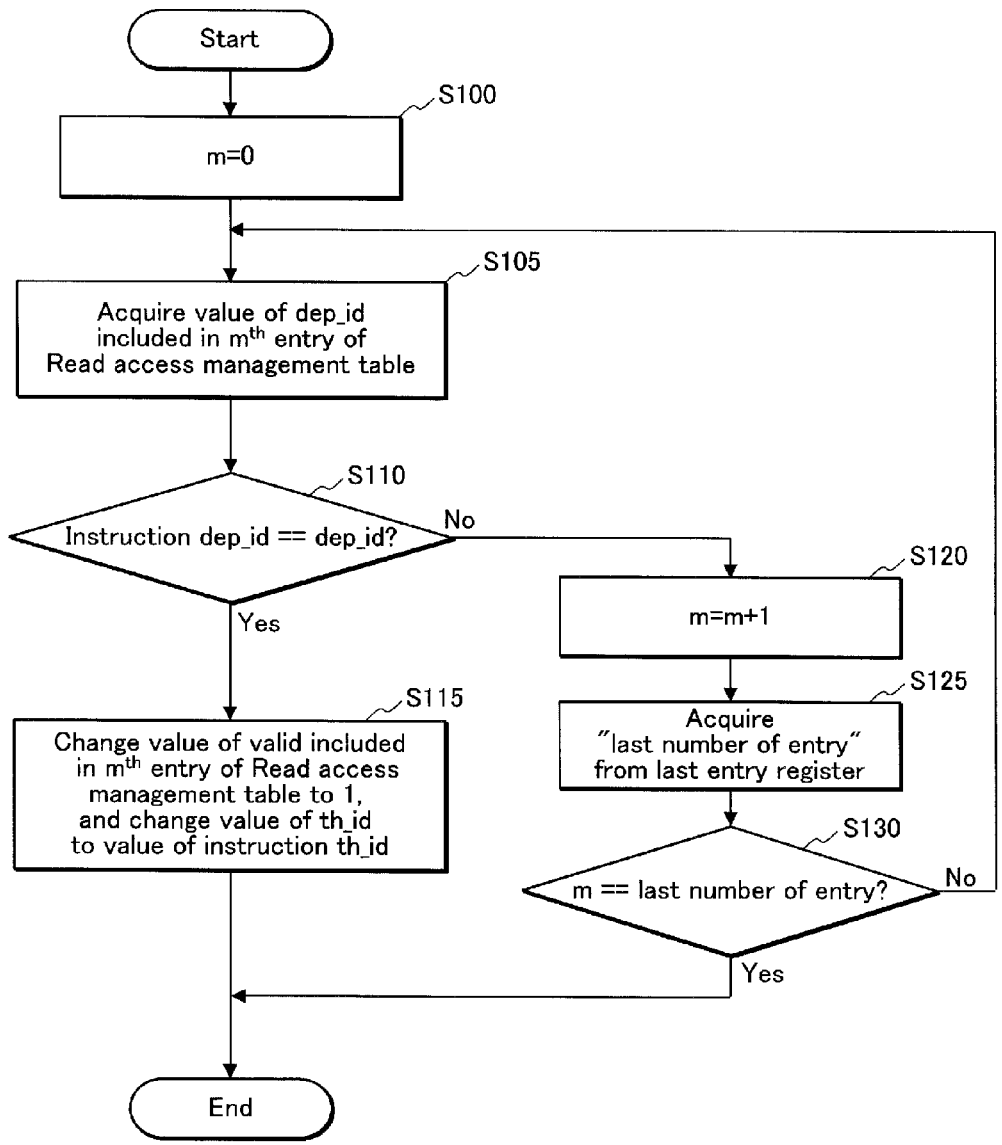
FIG. 5 is a flowchart showing operations pertaining to update of the Read access management table T150.

The following describes update operations of the Read access management table T150 that are performed when instructions up to the instruction indicated by a PC managed by the access management table T100 are executed, with reference to a flowchart in FIG. 5.

On acquiring a value of the instruction dep_id, a value of the instruction th_id, and the instruction detection signal from the instruction detecting unit 117, the update control unit 114 initializes a counter m to 0, the counter m being used for control to read an entry from the Read access management table T150 (step S100). Here, the counter m is stored in the update control unit 114.

The update control unit 114 acquires a value of the dep_id included in the $m^{th}$ entry from the Read access management table T150 (step S105), and judges whether or not the acquired value of the dep_id matches the value of the instruction dep_id acquired from the instruction detecting unit 117 (step S110).

When the result of judgment is affirmative ("Yes" in step S110), the update control unit 114 changes a value of the valid included in the $m^{th}$ entry of the Read access management table T150 to "1", and changes a value of the th_id to the value of the instruction th_id acquired from the instruction detecting unit 117 (step S115).

When the result of judgment is negative ("No" in step S110), the update control unit 114 increments the value of counter m (step S120). The update control unit 114 acquires the last number of entry registered in the Read access management table T150 from the last entry register (step S125). Then the update control unit 114 judges whether or not the value of counter m matches the last number of entry (step S130). If the result of judgment is affirmative ("Yes" in step S130), the processing ends, and if the result of judgment is negative ("No" in step S130), the processing returns to step S105.

(3) Regarding Processing Performed When Detecting Read Instruction

Here, operations performed when a Read instruction is executed are described with reference to a flowchart shown in FIG. 6. Note that such operations start when the read detecting unit 116 acquires a Read execution signal corresponding to a Read instruction, a value of Read address, and a value of Read th_id from the memory access 120.

First, the table read control unit 400 initializes a counter p to 0, the counter p being used for control to read an entry from the Read access management table T150 (step S200). Here, the counter p is stored in the table read control unit 400.

The Read address comparing unit 402 acquires a value of the Address included in the $p^{th}$ entry of the Read access management table T150 (step S205), and judges whether or not the acquired value of the Address matches the value of the Read address acquired from the memory access 120 (step S210).

When the result of judgment performed by the Read address comparing unit 402 is affirmative ("Yes" in step S210), the valid selecting unit 401 acquires a value of the entry_valid included in the $p^{th}$ entry of the Read access management table T150 (step S215). The valid selecting unit 401 judges whether or not the acquired value of the entry_valid is "1" (step S220).

When the result of judgment performed by the valid selecting unit 401 is affirmative ("Yes" in step S220), the adder 404 acquires a value of the th_id and a value of the th_stride that are included in the $p^{th}$ entry of the Read access management table T150, and calculates the sum of these values (step S225).

The th_id comparing unit 403 judges whether or not the calculated sum (sum of the value of the th_id and the value of the th_stride) matches the value of the Read th_id acquired from the memory access 120 (step S230).

When the result of judgment is affirmative ("Yes" in step S230), the valid selecting unit 401 acquires a value of the valid included in the $p^{th}$ entry of the Read access management table T150 (step S235). Here, when the result of judgment is affirmative (match), it means that writing has been completed during execution of a desired preceding thread indicated by the value of the th_stride in a memory area.

The valid selecting unit 401 judges whether or not the acquired value of the valid is "1" (step S240).

If the result of judgment is affirmative ("Yes" in step S240), the valid selecting unit 401 outputs a Read access signal whose value is 0 to the instruction fetch control unit 102 (step S245).

If the result of judgment performed by the Read address comparing unit 402 is negative ("No" in step S210), and the result of judgment performed by the valid selecting unit 401 is negative ("No" in step S220), the table read control unit 400 increments a value of counter p (step S250). The table read control unit 400 acquires the last number of entry registered in the Read access management table T150 from the last entry register (step S255). Then the table read control unit 400 judges whether or not the value of counter p matches the last number of entry (step S260). If the result of judgment is affirmative ("Yes" in step S260), the processing ends, and if the result of judgment is negative ("No" in step S260), the processing returns to step S205.

If the value of the valid is judged not to be 1 ("No" in step S240), the valid selecting unit 401 outputs a Read access signal whose value is 1 to the instruction fetch control unit 102 (step S265).

Here, when the instruction fetch control unit 102 acquires the Read access signal and the value of the acquired signal is 1, the instruction fetch control unit 120 stops an instruction execution sequence that has been executed, and activates branch processing for a special processing vector that corresponds to an exception occurrence. This is because it is necessary to generate an exception and enter a sequence for waiting for completion of writing, since the instructions up to the instruction indicated by the PC managed in the access management table T100 have not been executed, i.e., a desired preceding thread has not completed writing in a memory area.

1.3 Conclusion

As described above, the multi-thread processor 100 shown in the present Embodiment can maintain a dependency relationship for executing a read instruction after a plurality of write instructions have been executed, for example.

In addition, by managing execution of instructions based on a hardware level, a code for synchronization is not necessary, and accordingly communication overhead becomes small compared with conventional technology using a semaphore. Therefore, it is possible to realize a processor whose software processing for managing dependency relationships among threads does not cause significant performance degradation, even when the number of threads is large and the dependency relationships become complicated.

In addition, generation of the above access management table T100 and the Read access management table T150 is timed to occur after a program to be executed is divided with use of a parallelizing tool and assigned to each thread so that parallel processing is possible. This is because by assigning the divided pieces of program to the respective threads, the dependency relationships among threads become clear.

2. Embodiment 2

Embodiment 2 of the present invention is described below with reference to the drawings. The description centers on a difference from Embodiment 1.

2.1 Structure

Figure 7:
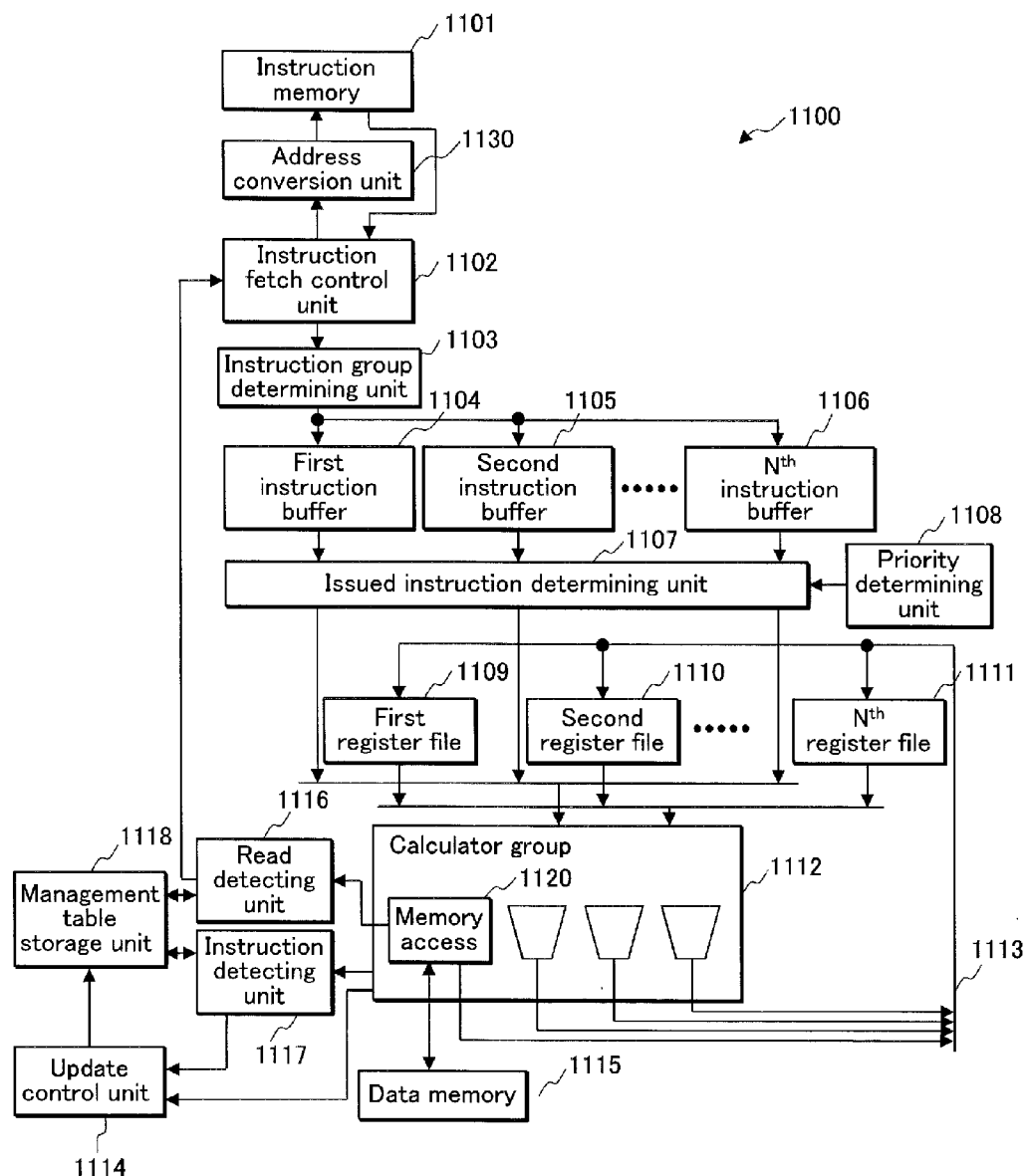
FIG. 7 shows a structure of a multi-thread processor 1100.

FIG. 7 is a block diagram showing a structure of a multi-thread processor 1100 pertaining to Embodiment 2.

The multi-thread processor 1100 independently executes N (where N is an integer equal to or greater than two) instruction streams (N threads) at the same time, and includes an instruction memory 1101, an instruction fetch control unit 1102, an instruction group determining unit 1103, N instruction buffers (a first instruction buffer 1104, a second instruction buffer 1105, . . . , an $N^{th}$ instruction buffer 1106), an issued instruction determining unit 1107, a priority determining unit 1108, N register files (a first register file 1109, a second register file 1110, . . . , an $N^{th}$ register file 1111), a calculator group 1112, a write back bus 1113, an update control unit 1114, a data memory 1115, a read detecting unit 1116, an instruction detecting unit 1117, a management table storage unit 1118, and an address conversion unit 1130.

Here, the instruction buffers and the register files are in one-to-one correspondence, and constitute N logic processors, in the same manner as Embodiment 1.

(1) Address Conversion Unit 1130

The address conversion unit 1130 converts a fetch address (logic address) input from the instruction fetch control unit 1102 to another address (physical address) with use of a conversion table T200, and outputs the converted address to the instruction memory 1101. Such operations are performed by a translation lookaside buffer (TLB) for managing pages of a virtual space on a processor provided with a memory management unit (MMU) for handling the virtual space (see Non-Patent Literature 2 below, for example).

[Non-Patent Literature 2]

"Modem Processor Design", McGraw-Hill Series in Electrical and Computer Engineering, pp. 142-145 (ISBN0-07-057064)

The following describes a specific function of the address conversion unit 1130 in the present Embodiment.

Figure 8:
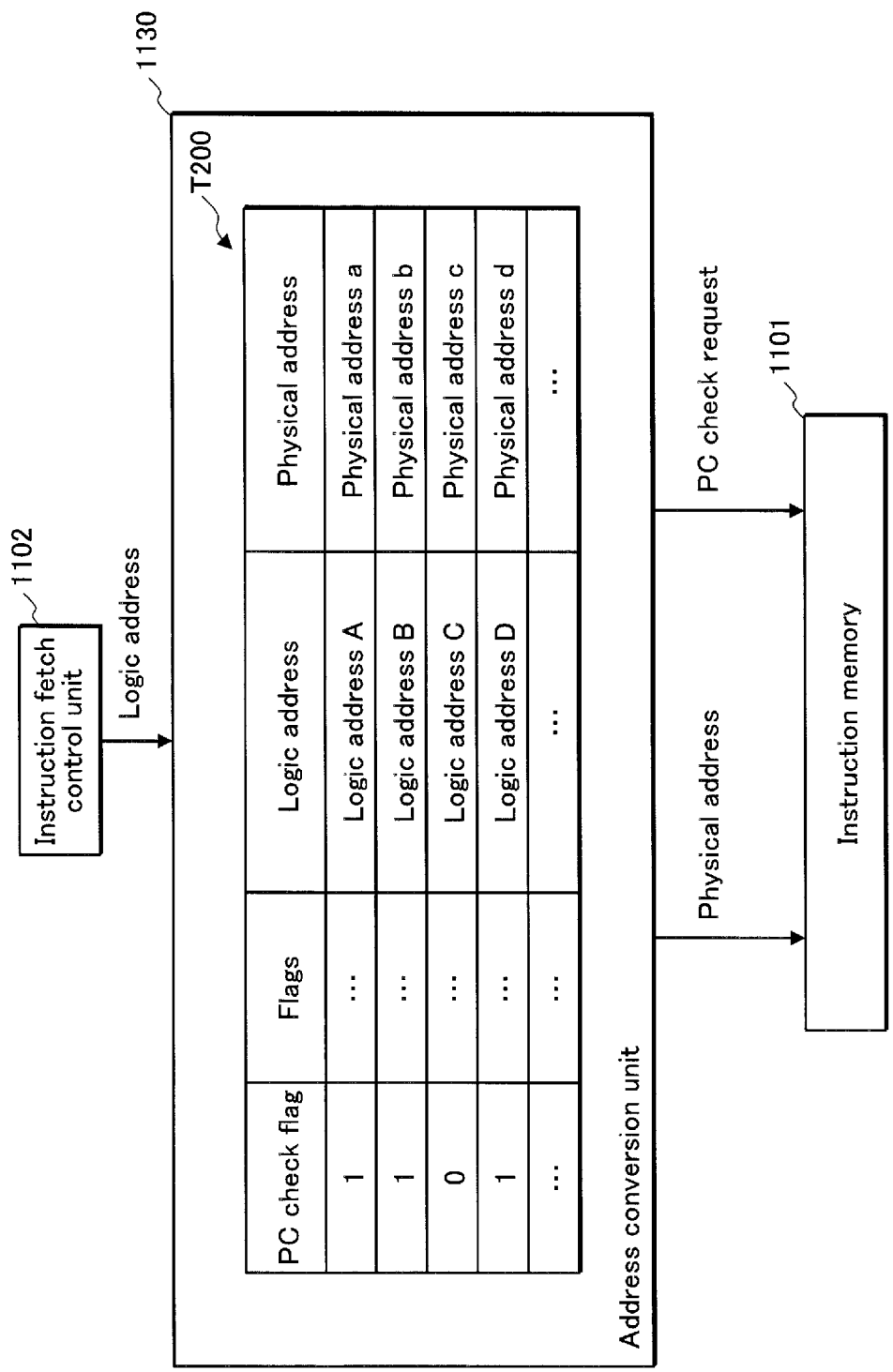
FIG. 8 shows an example of a structure of an address conversion unit 1130 and a data structure of a conversion table T200.

As shown in FIG. 8, the address conversion unit 1130 includes the conversion table T200.

The conversion table T200 is provided with an area for storing a plurality of sets (entries) composed of a PC check flag, flags, a logic address and a physical address. Here, a memory area of 4 KB is managed for each entry, and such a memory area is referred to as a page.

The PC check flag indicates whether or not a page included in each entry has a possibility of including a PC that needs to be notified to the instruction detecting unit 1117 so as to be checked. To be specific, the value 1 of the PC check flag indicates that the entry has the possibility of including a PC that needs to be checked, and the value 0 of the PC check flag indicates that the entry does not have the possibility of including a PC that needs to be checked.

The flags are included in a general TLB, and a description thereof is omitted here.

The logic address is a logic address field included in a general TLB, and a detailed description thereof is omitted here.

The physical address is a physical address field included in a general TLB, and a detailed description thereof is omitted here.

On receiving the logic address from the instruction fetch control unit 1102, the address conversion unit 1130 converts the logic address to a physical address with use of the conversion table T200.

When a value of the PC check flag corresponding to the received logic address is 1, the address conversion unit 1130 outputs the physical address and a PC check request whose value is 1 to the instruction memory 1101. When a value of the PC check flag is 0, the address conversion unit 1130 outputs the physical address and a PC check request whose value is 0 to the instruction memory 1101. Here, the PC check request indicates whether or not a PC of an instruction that is notified to the instruction detecting unit 1117 and executed needs to be checked. The value 1 of PC check request indicates that the PC needs to be checked, and the value 0 of PC check request indicates that the check is unnecessary.

(2) Instruction Memory 1101

The instruction memory 1101 stores therein an instruction to be executed by the multi-thread processor, and stores therein N instruction streams (threads) to be independently executed, in the same manner as Embodiment 1.

After acquiring a PC check request whose value is 1 from the instruction fetch control unit 1102, when fetching an instruction specified by the physical address, the instruction memory 1101 adds flag information indicating that the fetched instruction is targeted to be checked, and outputs the fetched instruction and the flag information to the instruction fetch control unit 1102.

Following operations of decoding, scheduling, and executing the instruction are performed while the flag information is added.

(3) Instruction Fetch Control Unit 1102

The instruction fetch control unit 1102 stores therein a PC of each thread and reads an instruction that is to be subsequently executed from the instruction memory.

To be specific, the instruction fetch control unit 1102 outputs a logic address of the instruction that is to be subsequently executed to the address conversion unit 1130, and after that, acquires the instruction from the instruction memory 1101. When the instruction is acquired and a PC of the instruction needs to be checked, the flag information is added.

(4) Instruction Group Determining Unit 1103

The instruction group determining unit 1103 is the same as the instruction group determining unit 103 shown in Embodiment 1. Therefore, a description thereof is omitted here.

(5) First Instruction Buffer 1104 through N$^{th}$ Instruction Buffer 1106

Each of the first instruction buffer 1104 through the N$^{th}$ instruction buffer 1106 is the same as each instruction buffer shown in Embodiment 1. Therefore, descriptions thereof are omitted here. Note that hereinafter, the i$^{th}$ instruction stream is referred to as the i$^{th}$ instruction stream (i being an integer between one and N, inclusive).

(6) Issued Instruction Determining Unit 1107

The issued instruction determining unit 1107 is the same as the issued instruction determining unit 107 shown in Embodiment 1. Therefore, a description thereof is omitted here.

(7) Priority Determining Unit 1108

The priority determining unit 1108 is the same as the priority determining unit 108 shown in Embodiment 1. Therefore, a description thereof is omitted here.

(8) First Register File 1109 through N$^{th}$ Register File 1111

Each of the first register file 1109 through the N$^{th}$ register file 1111 is the same as each register file shown in Embodiment 1. Therefore, descriptions thereof are omitted here.

The calculator group 1112 is a processing unit including (i) a plurality of calculators such as an adder and a multiplier, and (ii) a memory access 1120, in the same manner as Embodiment 1. Here, the memory access 1120 is a calculator for executing an instruction to access a data memory.

When the flag information is added to an instruction that is to be executed, the calculator group 1112 notifies the instruction detecting unit 1117 that a PC needs to be checked.

(10) Write Back Bus 1113

The write back bus 1113 is the same as the write back bus 113 shown in Embodiment 1. Therefore, a description thereof is omitted here.

(11) Data Memory 1115

The data memory 1115 is the same as the data memory 115 shown in Embodiment 1. Therefore, a description thereof is omitted here.

(12) Management Table Storage Unit 1118

The management table storage unit 1118 stores therein an access management table and a Read access management table, in the same manner as Embodiment 1. Note that in the following description, the access management table T100 and the Read access management table T150 shown in FIGS. 2A and 2B are used when necessary.

(13) Update Control Unit 1114

The update control unit 1114 updates the access management table T100 and the Read access management table T150, in the same manner as the update control unit 114 of Embodiment 1. Note that a detailed function of update is the same as Embodiment 1. Therefore, a description thereof is omitted here.

(14) Instruction Detecting Unit 1117

The instruction detecting unit 1117 has the same components as the instruction detecting unit 117 shown in Embodiment 1. When an instruction is executed, the instruction detecting unit 1117 detects whether or not a value of PC of the instruction is managed by the access management table T100 that is stored in the management table storage unit 1118.

A difference from Embodiment 1 is that the above processing starts when the calculator group 1112 notifies the instruction detecting unit 1117 that a PC needs to be checked.

The following description uses the components shown in Embodiment 1, when necessary.

(15) Read Detecting Unit 1116

The read detecting unit 1116 has the same components as the read detecting unit 116 shown in Embodiment 1. When an instruction to access a data memory is executed, the read detecting unit 1116 detects whether or not an access target address of the instruction is in a memory area managed by the Read access management table T150 stored in the management table storage unit 1118.

Note that a detailed function is the same as Embodiment 1. Therefore, a description thereof is omitted here.

2.2 Operations

Operations of the multi-thread processor 1100 are described below. The description centers on a difference from the operations of the multi-thread processor 100 shown in Embodiment 1.

(1) Operations Performed when Instruction is Detected

Operations performed when an instruction is detected follow the same flow as the operations shown in Embodiment 1 (see FIG. 4), but a timing at which the operations start is different. According to the present Embodiment, when the calculator group 1112 notifies the instruction detecting unit 1117 that a PC needs to be checked, the instruction detecting unit 1117 starts processing.

(2) Regarding Update Operations of Read Access Management Table T150

Operations of update of the Read access management table T150 in the present Embodiment are the same as the operations shown in Embodiment 1 (see FIG. 5). Therefore, descriptions thereof are omitted here.

(3) Regarding Operations Performed When Detecting Read Instruction

Figure 6:
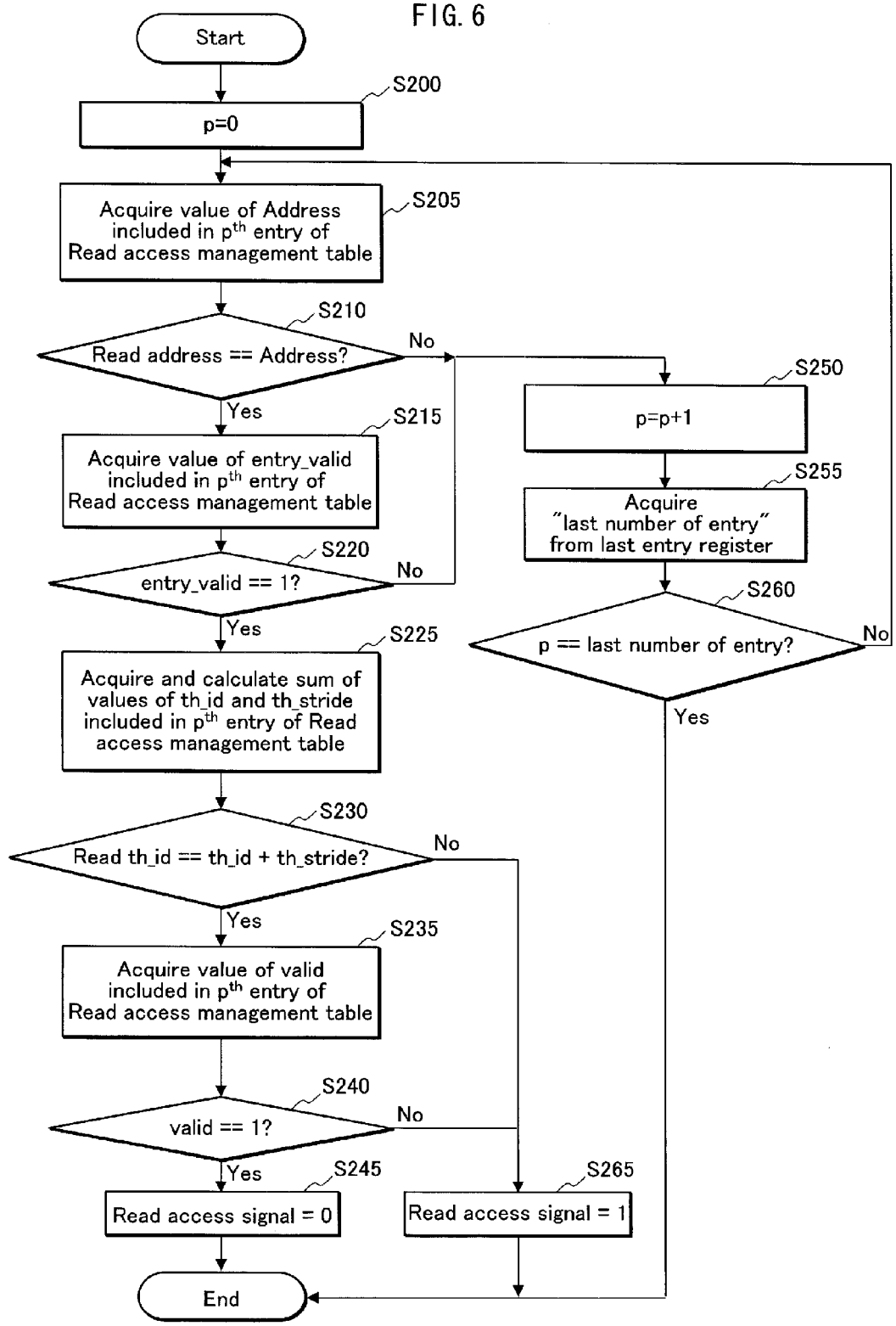
FIG. 6 is a flowchart showing operations performed when a Read instruction is executed.

Operations performed when a Read instruction is detected in the present Embodiment are the same as the operations shown in Embodiment 1 (see FIG. 6). Therefore, descriptions thereof are omitted here.

2.3 Conclusion

As described above, by using the address conversion unit 1130, it is possible to (i) greatly reduce the number of instructions that are to be executed by the calculator group 1112 and checked by the instruction detecting unit 1117, (ii) reduce the number of operations performed by the instruction detecting unit 1117, and (iii) reduce the electric power consumption of the circuit.

In addition, in the same manner as Embodiment 1, the multi-thread processor 1100 shown in the present Embodiment can maintain a dependency relationship for executing a read instruction after a plurality of write instructions have been executed, for example.

In the same manner as Embodiment 1, according to Embodiment 2, execution of instructions is managed based on a hardware level, and a code for synchronization is not necessary, and accordingly communication overhead becomes small compared with conventional technology using a semaphore. Therefore, it is possible to realize a processor whose software processing for managing dependency relationships among threads does not cause significant performance degradation, even when the number of threads is large and the dependency relationships become complicated.

In addition, in the same manner as Embodiment 1, generation of the access management table T100 and the Read access management table T150 is timed to occur after a program to be executed is divided with use of a parallelizing tool and assigned to each thread so that parallel processing is possible. In addition, the conversion table T200 is generated after a program to be executed is divided with use of a parallelizing tool and assigned to each thread so that parallel processing is possible. This is because a page and the like that are used for each thread become clear by assigning the divided pieces of program to the respective threads.

3. Embodiment 3

Embodiment 3 of the present invention is described below with reference to the drawings. The description centers on a difference from Embodiments 1 and 2.

3.1 Structure

Figure 9:
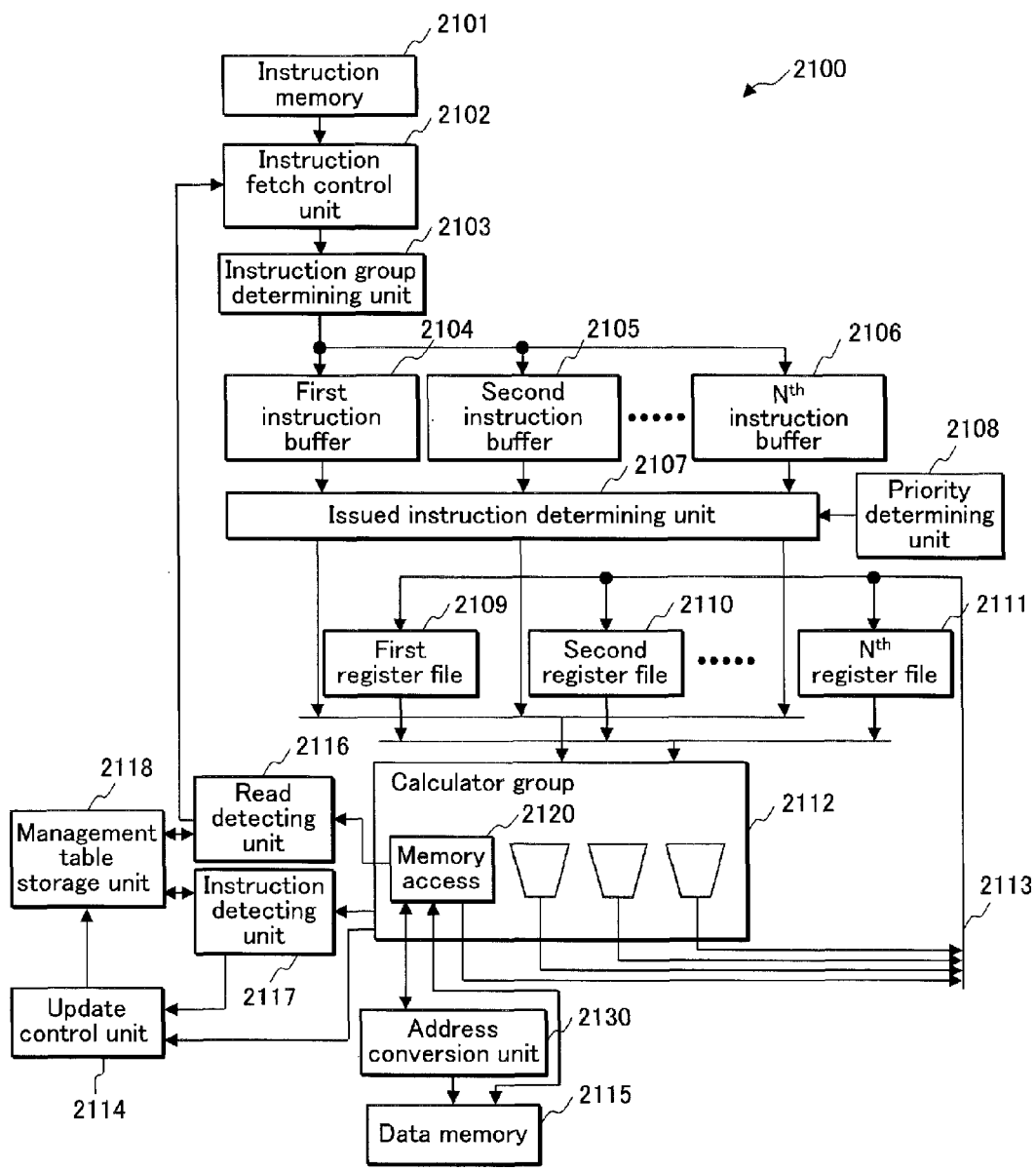
FIG. 9 shows a structure of a multi-thread processor 2100.

FIG. 9 is a block diagram showing a structure of a multi-thread processor 2100 pertaining to Embodiment 3.

The multi-thread processor 2100 independently executes N (where N is an integer equal to or greater than two) instruction streams (N threads) at the same time, and includes an instruction memory 2101, an instruction fetch control unit 2102, an instruction group determining unit 2103, N instruction buffers (a first instruction buffer 2104, a second instruction buffer 2105, . . . , an $N^{th}$ instruction buffer 2106), an issued instruction determining unit 2107, a priority determining unit 2108, N register files (a first register file 2109, a second register file 2110, . . . , an $N^{th}$ register file 2111), a calculator group 2112, a write back bus 2113, an update control unit 2114, a data memory 2115, a read detecting unit 2116, an instruction detecting unit 2117, a management table storage unit 2118, and an address conversion unit 2130.

Here, the instruction buffers and the register files are in one-to-one correspondence, and constitute N logic processors, in the same manner as Embodiments 1 and 2.

(1) Instruction Memory 2101

The instruction memory 2101 stores therein an instruction to be executed by the multi-thread processor, and stores therein N instruction streams (threads) to be independently executed, in the same manner as Embodiment 1.

(2) Instruction Fetch Control Unit 2102

The instruction fetch control unit 2102 is the same as the instruction fetch control unit 102 shown in Embodiment 1. Therefore, a description thereof is omitted here.

(3) Instruction Group Determining Unit 2103

The instruction group determining unit 2103 is the same as the instruction group determining unit 103 shown in Embodiment 1. Therefore, a description thereof is omitted here.

(4) First Instruction Buffer 2104 through $N^{th}$ Instruction Buffer 2106

Each of the first instruction buffer 2104 through the $N^{th}$ instruction buffer 2106 is the same as each instruction buffer shown in Embodiment 1. Therefore, descriptions thereof are omitted here. Note that hereinafter, the $i^{th}$ instruction stream is referred to as the $i^{th}$ instruction stream (i being an integer between one and N, inclusive).

(5) Issued Instruction Determining Unit 2107

The issued instruction determining unit 2107 is the same as the issued instruction determining unit 107 shown in Embodiment 1. Therefore, a description thereof is omitted here.

(6) Priority Determining Unit 2108

The priority determining unit 2108 is the same as the priority determining unit 108 shown in Embodiment 1. Therefore, a description thereof is omitted here.

(7) First Register File 2109 through $N^{th}$ Register File 2111

Each of the first register file 2109 through the $N^{th}$ register file 2111 is the same as each register file shown in Embodiment 1. Therefore, descriptions thereof are omitted here.

(8) Address Conversion Unit 2130

The address conversion unit 2130 converts an access address (logic address) input from the memory access 2120 to another address (physical address) with use of a conversion table T300, and outputs the converted address to the data memory 2115. Such operations are performed by a TLB for managing pages of a virtual space on a processor provided with an MMU for handling the virtual space (see Non-Patent Literature 1).

The following describes a specific function of the address conversion unit 2130 pertaining to the present Embodiment.

Figure 10:
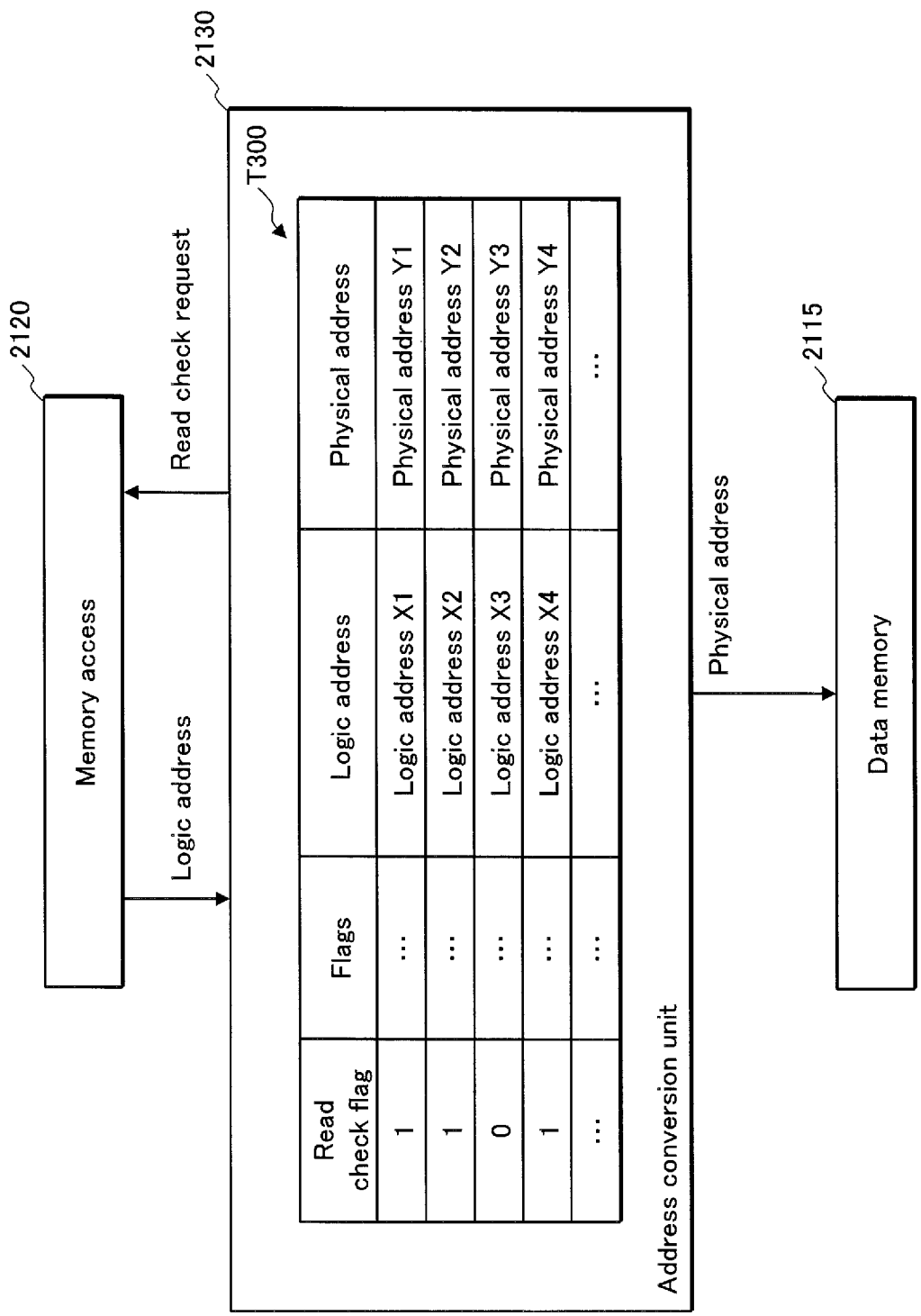
FIG. 10 shows an example of a structure of an address conversion unit 2130 and a data structure of a conversion table T300.

As shown in FIG. 10, the address conversion unit 2130 includes the conversion table T300.

The conversion table T300 is provided with an area for storing a plurality of sets (entries) composed of a Read check flag, flags, a logic address and a physical address. Here, a memory area of 4 KB is managed for each entry, and such a memory area is referred to as a page.

The Read check flag indicates whether or not a page included in each entry has a possibility of including a Read address that is to be notified to the read detecting unit 2116 so as to be checked. To be specific, the value 1 of the Read check indicates that the entry has a possibility of including a Read address that needs to be checked, and the value 0 of the Read check flag indicates that the entry does not have a possibility of including a Read address that needs to be checked.

The flags are included in a general TLB, and a description thereof is omitted here.

The logic address is a logic address field included in a general TLB, and a description thereof is omitted here.

The logic address is a physical address field included in a general TLB, and a description thereof is omitted here.

On receiving the logic address from the memory access 2120, the address conversion unit 2130 converts the logic address to a physical address with use of the conversion table T300.

When a value of Read check flag corresponding to the received logic address is 1, the address conversion unit 2130 outputs a Read check request whose value is 1 to the memory access 2120. When the value of Read check flag is 0, the address conversion unit 2130 outputs a Read check request whose value is 0 to the memory access 2120. Here, the Read check request indicates whether or not a Read access of the Read instruction that is notified to the read detecting unit 2116 and executed needs to be checked. The value 1 of the Read check request indicates that the Read access needs to be checked, and the value 0 of the Read check request indicates that check is unnecessary.

The calculator group 2112 is a processing unit including (i) a plurality of calculators such as an adder and a multiplier, and (ii) a memory access 2120, in the same manner as Embodiment 1. Here, the memory access 2120 is a calculator for executing an instruction to access a data memory.

On receiving a Read check request corresponding to an instruction that is to be executed from the address conversion unit 2130, the memory access 2120 notifies the read detecting unit 2116 whether or not a Read address needs to be checked.

(10) Write Back Bus 2113

The write back bus 2113 is the same as the write back bus 113 shown in Embodiment 1. Therefore, a description thereof is omitted here.

(11) Data Memory 2115

The data memory 2115 is the same as the data memory 115 shown in Embodiment 1. Therefore, a description thereof is omitted here.

(12) Management Table Storage Unit 2118

The management table storage unit 2118 stores therein an access management table and a Read access management table, in the same manner as Embodiment 1. Note that in the following description, the access management table T100 and the Read access management table T150 shown in FIGS. 2A and 2B are used when necessary.

(13) Update Control Unit 2114

The update control unit 2114 updates the access management table T100 and the Read access management table T150, in the same manner as the update control unit 114 of Embodiment 1. Note that a detailed function of update is the same as Embodiment 1. Therefore, a description thereof is omitted here.

(14) Instruction Detecting Unit 2117

The instruction detecting unit 2117 has the same components as the instruction detecting unit 117 shown in Embodiment 1. When an instruction is executed, the instruction detecting unit 2117 detects whether or not a PC of the instruction is managed by the access management table T100 that is stored in the management table storage unit 2118.

Note that a detailed function is the same as Embodiment 1. Therefore, a description thereof is omitted here.

(15) Read Detecting Unit 2116

The read detecting unit 2116 has the same components as the read detecting unit 116 shown in Embodiment 1. When an instruction to access a data memory is executed, the read detecting unit 2116 detects whether or not an access target address of the instruction is in a memory area managed by the read access management table T150 stored in the management table storage unit 1118.

A difference from Embodiments 1 and 2 is that the above processing starts when the memory access 2120 notifies the read detecting unit 2116 that a Read address needs to be checked.

The following description uses the components shown in Embodiment 1, when necessary.

3.2 Operations

Operations of the multi-thread processor 2100 are described below. The description centers on a difference from the operations of the multi-thread processor 100 shown in Embodiment 1, and the operations of the multi-thread processor 1100 shown in Embodiment 2.

(1) Operations when Instruction is Detected

Figure 4:
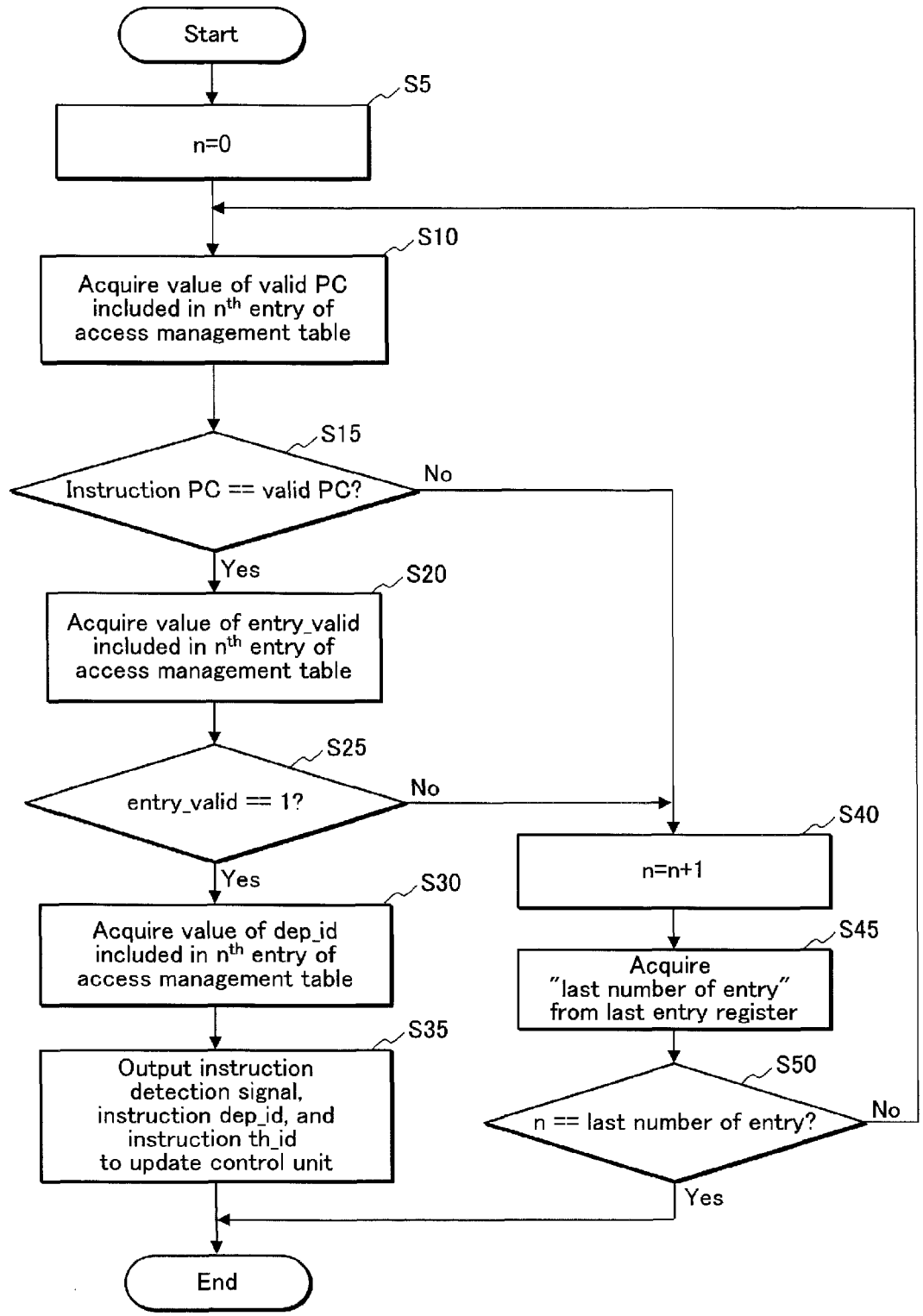
FIG. 4 is a flowchart showing operations performed by the instruction detection unit 117.

Operations when an instruction is detected are the same as the operations shown in Embodiment 1 (see FIG. 4). Therefore, descriptions thereof are omitted here.

(2) Regarding Update Operations of Read Access Management Table T150

Operations of update of the Read access management table T150 in the present Embodiment are the same as the operations shown in Embodiment 1 (see FIG. 5). Therefore, descriptions thereof are omitted here.

(3) Regarding Operations Performed when Detecting Read Instruction

Operations performed when a Read instruction is detected in the present Embodiment are the same as the operations shown in Embodiment 1 (see FIG. 6), but a timing at which the operations start is different. In the present Embodiment, the read detecting unit 2116 starts the processing when the memory access 2120 notifies the read detecting unit 2116 that a Read address needs to be checked.

Note that the detailed flow of operations is the same as the flowchart shown in FIG. 4. Therefore, a description thereof is omitted here.

3.3 Conclusion

As described above, by using the address conversion unit 2130, it is possible to (i) greatly reduce the number of instructions that are to be executed by the calculator group 2112 and checked by the read detecting unit 2116, (ii) reduce the number of operations performed by the read detecting unit 2116, and (iii) reduce the electric power consumption of the circuit.

In addition, in the same manner as Embodiment 1, the multi-thread processor 2100 shown in the present Embodiment can maintain a dependency relationship for executing a read instruction after a plurality of write instructions have been executed, for example.

In the same manner as Embodiment 1, according to Embodiment 3, execution of instructions is managed based on a hardware level, a code for synchronization is not necessary, and accordingly communication overhead becomes small compared with conventional technology using a semaphore. Therefore, it is possible to realize a processor whose software processing for managing dependency relationships among threads does not cause significant performance degradation, even when the number of threads is large and the dependency relationships become complicated.

Note that the multi-thread processor 2100 shown in the present Embodiment has the address conversion unit 2130 in addition to the components of the multi-thread processor 100 shown in Embodiment 1, but the multi-thread processor 2100 shown in the present Embodiment may have the address conversion unit 2130 in addition to the components of the multi-thread processor 1100 shown in Embodiment 2.

In addition, in the same manner as Embodiment 1, generation of the access management table T100 and the Read access management table T150 is timed to occur after a program to be executed is divided with use of a parallelizing tool and assigned to each thread so that parallel processing is possible. Furthermore, the conversion table T300 is generated after the program to be executed is divided with use of the parallelizing tool and assigned to each thread so that parallel processing is possible. This is because a page and the like that are used for each thread become clear by assigning the divided pieces of program to the respective threads.

4. Embodiment 4

Embodiment 4 of the present invention is described below with reference to the drawing. The description centers on a difference from Embodiment 1.

Figure 11:
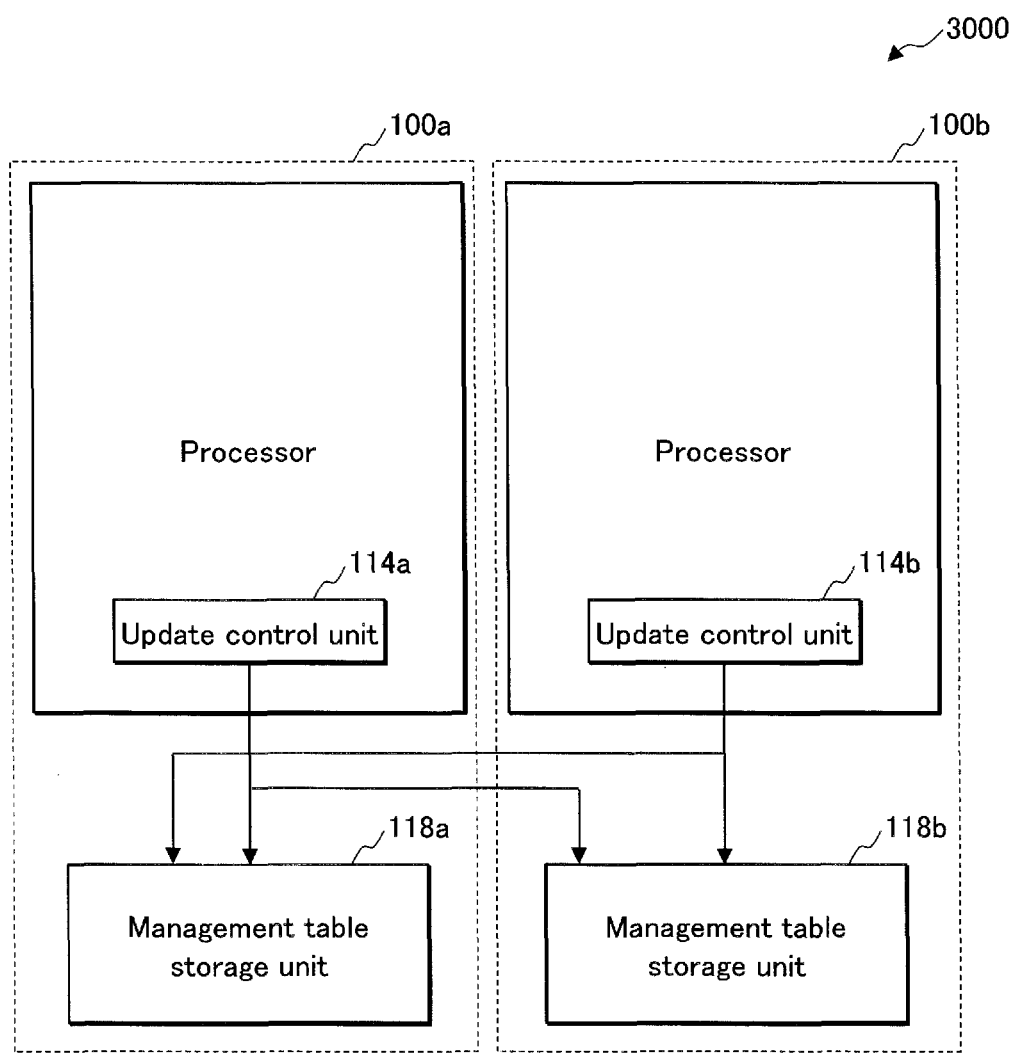
FIG. 11 shows a hardware structure of a multi-core processor system 3000.

FIG. 11 is a block diagram showing a hardware structure of a multi-core processor system 3000 pertaining to Embodiment 4.

The multi-core processor system 3000 is composed of a multi-thread processors 100*a* and 100*b* as shown in FIG. 11.

The multi-thread processors 100*a* and 100*b* each have the same structure as the multi-thread processor 100 shown in Embodiment 1.

A difference from the multi-thread processor 100 is that functions of an update control unit 114*a* included in the multi-thread processor 100*a* and an update control unit 114*b* included in the multi-thread processor 100*b* are different from the function of update control unit 114 in Embodiment 1.

The following description centers on the difference.

A management table storage unit 118*a* included in the multi-thread processor 100*a* and a management table storage unit 118*b* included in the multi-thread processor 100*b* are the same as the management table storage unit 118 shown in Embodiment 1. Therefore, descriptions thereof are omitted here.

The update control unit 114*a* updates each table stored in the multi-thread processor 100*a*, and also updates each table stored in the multi-thread processor 100*b*.

Also, the update control unit 114*b* updates each table stored in the multi-thread processor 100*b*, and also updates each table stored in the multi-thread processor 100*a*.

Note that a timing in which update is performed is the same as Embodiment 1. Therefore, a detailed description thereof is omitted here.

As described above, it is possible to reduce close coupling between processors and lower the difficulty of implementation as a semiconductor.

Note that each of the multi-thread processor 100*a* and 100*b* shown in the present Embodiment has the structure of the multi-thread processor 100 shown in Embodiment 1, in which the update control unit 114 has been modified. However, each of the multi-thread processor 100*a* and 100*b* shown in the present Embodiment is not limited to this. Each of the multi-thread processor 100*a* and 100*b* shown in the present Embodiment may have the structure of the multi-thread processor 1100 shown in Embodiment 2, in which the update control unit 1114 has been modified, or the structure of the multi-thread processor 2100 shown in Embodiment 3, in which the update control unit 2114 has been modified.

5. Embodiment 5

With respect to Embodiment 5 pertaining to the present invention, the following describes operations performed when the multi-thread processor 100 shown in Embodiment 1 is applied to decoding and encoding processing of system LSI video aimed at a digital AV equipment.

First, application to decoding processing is described.

Figure 12:
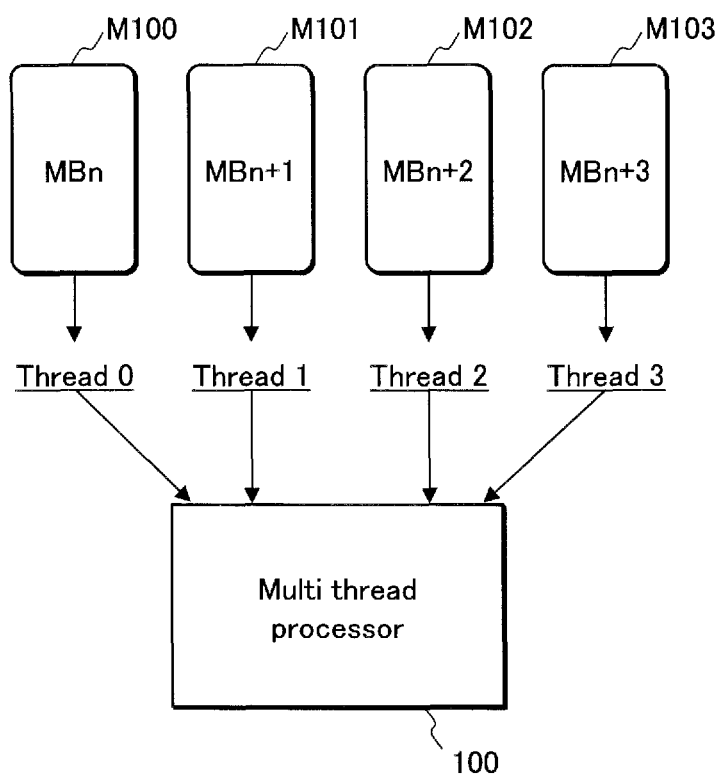
FIG. 12 is a schematic view of a case where the multi-thread processor 100 is used for decoding processing of a video.

The multi-thread processor 100 decodes four macro blocks (MBn, MBn+1, MBn+2, and MBn+3) as shown in FIG. 12. The multi-thread processor 100 performs decoding processing of each macroblock while setting pieces of processing in units of macroblocks (MBn, MBn+1, MBn+2, and MBn+3) to threads 0 to 3. Here, the macroblocks MBn, MBn+1, MBn+2, and MBn+3 are assumed to be continuously arranged.

For example, in order to decode a video signal compressed with use of a standard such as H.264, it is required to perform analysis of bit streams, variable length decoding (VLD) processing of a variable-length-decoded signal, inverse quantization transformation (IQT) and inverse frequency transformation, motion compensation (MC), reconfiguration (Recon) of images, and deblocking filter processing (DBF).

Figure 13:
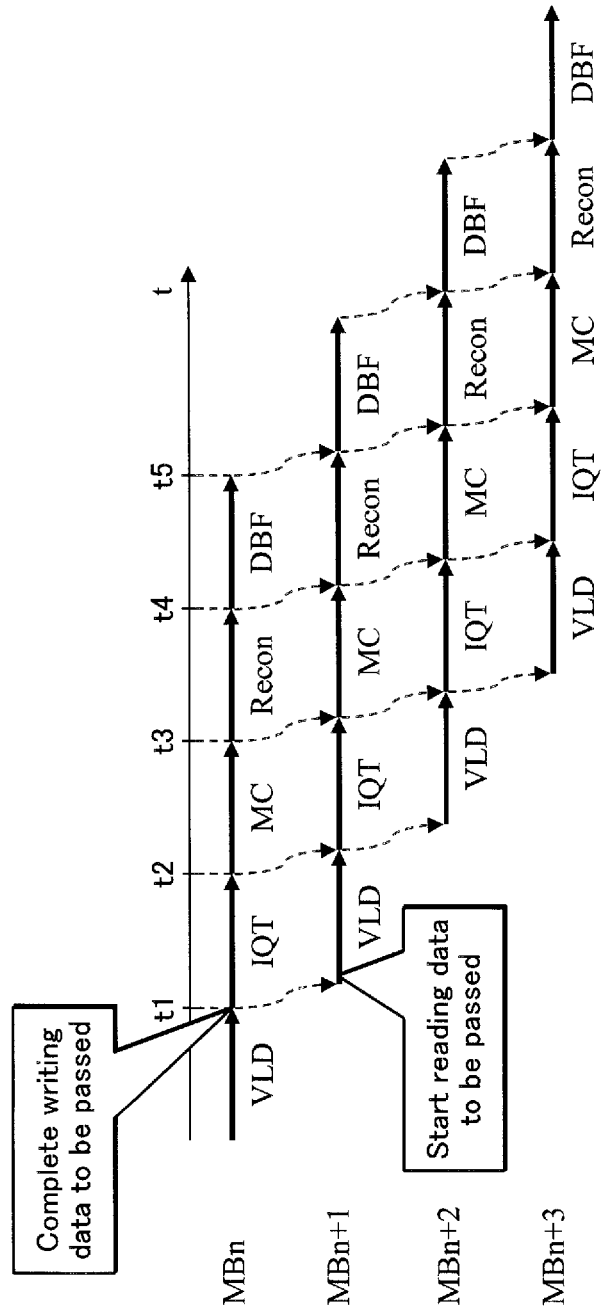
FIG. 13 shows dependency relationships pertaining to decoding processing among macroblocks.

In addition, in VLD of the macroblock MBn, for example, data to be referenced in the subsequent macroblock MBn+1 (data to be passed) is written in a memory area. As shown in FIG. 13, when writing of the data to be passed is completed at time t1, the multi-thread processor 100 updates a value of valid to 1 in accordance with an Address that corresponds to the memory area in the Read access management table T150. Thereby, the subsequent macroblock MBn+1 can start reading the data to be passed, which has been written in the memory area.

Similarly, at times t2, t3, t4, and t5, when each piece of processing pertaining to decoding (IQT, MC, Recon, and DBF) in the macroblock MBn is completed, i.e., when writing of data to be passed is completed, the multi-thread processor 100 updates the value of valid in accordance with the corresponding Address in the Read access management table T150 to 1. Thereby, when processing pertaining to decoding (IQT, MC, Recon, and DBF) is performed, the macroblock MBn+1 can start reading the data to be passed, which has been written by the macroblock MBn.

Note that dependency relationships between the macroblocks MBn+1 and MBn+2, and between the macroblocks MBn+2 and MBn+3 are the same as above, and descriptions thereof are omitted here.

Next, application to encoding processing is described.

Encoding processing of macroblocks normally includes subtraction for calculating a prediction error of image data that is targeted for encoding, quantizing processing for performing frequency transformation and quantization on the prediction error, encoding processing for variable-length-decoding a quantized DCT coefficient and a motion vector, processing pertaining to generation of a reference image, and processing pertaining to motion compensation.

A concept of operations of the multi-thread processor is the same as the operations of the above decoding processing. That is, when subtraction for a macroblock (for example, MBn) is completed, i.e., when writing of data to be passed to the subsequent macroblock MBn+1 is completed, the macroblock MBn+1 starts reading the data to be passed, which has been written.

In addition, dependency relationships of other pieces of processing are the same.

Thus, when decoding processing and encoding processing in units of macroblocks are performed for each thread, by managing the dependency relationship with use of PCs, it is possible to realize system LSI video whose software processing for managing the dependency relationships among threads does not cause significant performance degradation, even when the number of threads is large and the dependency relationships become complicated.

6. Modification

The present invention has been described above with respect to Embodiments. However, the present invention is not limited thereto. For example, the following modifications are expected.

(1) In Embodiment 1 above, when a value of Read address and a value of Address in the Read access management table T150 are compared, the comparison is performed with use of all address bits, but not limited to this.

For example, comparison may be performed with 128-bit precision by excluding the lower 7 bits from the target for comparison. Thereby, it is possible to reduce the amount of memory used for the Read access management table T150.

(2) In each Embodiment above, timings to store the access management table and the Read access management table in the management table storage unit may be determined by a user operation.

Otherwise, the access management table and the Read access management table may be prestored in a memory area different from the management table storage unit, and each of the tables may be copied from the different memory area to the management table storage unit by executing an exclusive instruction for specifying an address of the different memory area.

(3) In each Embodiment above, a PC controls detection of completion of writing performed in a certain memory area, i.e., detection of an instruction that exists at a specific location included in a thread. However, detection of an instruction is not limited to this.

For example, an exclusive instruction may be set at the specific location included in a thread targeted for detection. Otherwise, an interrupt processing routine may be performed to control the detection. According to the routine, a code for generating an OP exception before execution of the routine is placed at the specific location.

(4) Also, in each Embodiment above, as to a read instruction, besides decoding a read instruction with a processor element, exclusive processing may be performed on the read instruction. Such processing is performed with an error trapping routine such as modifying a code of the read instruction so that an OP exception occurs before execution of the routine.

(5) In each Embodiment above, entries of the access management table and entries of the Read access management table are in one-to-one correspondence, but not limited to this.

The entries of the access management table and the entries of the Read access management table may be in one-to-many correspondence. In this case, the read detecting unit FIG. 6 can realize the one-to-many correspondence by setting processing 5230 shown in FIG. 6 to proceed to step S250 when the result of judgment in step S230 is "No".

(6) In each Embodiment above, the length of memory area targeted for management may be fixed, or variable for each memory area targeted for management.

(7) In each Embodiment above, when data is read, an address is referenced. However, such a structure is not limited to this.

Reading may be performed by specifying a PC. For example, according to a dependency relationship between writing (Write) and reading (Read), when a PC cannot be specified in Write, the dependency relationship can be maintained by specifying a PC (instruction ensuring that writing has been completed) on a Read side.

(8) In each Embodiment above, a PC is specified as guarantee of completion of writing. However, such a structure is not limited to this.

Whether writing has been completed or not may be judged by referencing contents of a specific control register or contents of a memory.

(9) In Embodiment 5, parallel processing, i.e., thread assignment is performed on the macroblocks continuously arranged, but Embodiment 5 is not limited to this.

Parallel processing may be performed in units of macroblock lines, or in units of IDCTs in image processing, for example. Otherwise, parallel processing may be performed in units of groups of pictures (GOPs).

(10) The above methods may be realized as follows. A program describing procedures of a method described in the above Embodiments is stored in a memory, a central processing unit (CPU) and the like read the program from the memory, and the CPU executes the read program.

In addition, the program describing the procedures of the method may be stored in a recording medium and distributed.

(11) Embodiments and modifications that are described above may be combined.

7. Supplementary Information (1) One Embodiment of the present invention is a processor that executes a plurality of threads, comprising: a setting unit configured to set, when an instruction that exists at a location ensuring that writing into a memory area has been completed is executed, usage information indicating whether or not writing into the memory area has been completed such that the usage information indicates that writing into the memory area during execution of one thread has been completed, the memory area being shared among the one thread and another thread, the instruction being included in the one thread; and a control unit configured to (i) perform execution of a read instruction included in said another thread to read data stored in the memory area when the usage information indicates that writing into the memory area during execution of the one thread has been completed, and (ii) suppress execution of the read instruction when the usage information indicates that writing into the memory area during execution of the one thread has not been completed.

According to the above structure, by executing the instruction that exists at the location ensuring that writing into the memory area shared with other threads during execution of the one thread has been completed, the processor reads data stored in the memory area during execution of the another thread. That is, the processor ensures that the instruction that exists up to the instruction that exists at the location has been executed, and after that, the processor can read the data stored in the memory area during execution of the another thread. Thereby, the processor can maintain a dependency relationship for executing the read instruction after a plurality of write instructions have been executed, for example.

(2) Here, the setting unit may include a storage area for prestoring therein a value of a program counter corresponding to the instruction that exists at the location, upon receiving the value of the program counter from an external source, store the value in the storage area, and when a value of a program counter corresponding to an instruction included in the one thread and the value stored in the storage area match, set the usage information to indicate that writing into the memory area during execution of the one thread has been completed.

According to the above structure, the processor can easily specify the instruction that exists at the location ensuring that writing into the memory area during execution of the one thread has been completed, by using the PC.

(3) Here, the storage area may further store therein a plurality of pieces of usage information and a plurality of memory addresses in one-to-one correspondence, each memory address indicating a different one of locations in the memory area, the control unit may acquire, from said another thread, a read target address of one of the locations that is targeted for the read instruction, and when the read target address and one of the plurality of memory addresses match, the control unit may perform or suppress execution of the read instruction in accordance with one of the plurality of pieces of usage information corresponding to the one memory address.

According to the above structure, the processor stores the plurality of pieces of usage information and the plurality of memory addresses in one-to-one correspondence, and accordingly it is possible to easily specify a state of usage of the one location indicated by the one of the plurality of memory addresses that indicates the one location targeted for reading.

(4) Here, the processor may further comprise an address conversion unit configured (i) to convert a virtual address to a physical address, the virtual address being received when the data is read and (ii) to notify the control unit that a state of usage of the one location indicated by the one memory address needs to be checked when the physical address is related to the one memory address prestored in a permission unit, and upon receiving the notification, the control unit may judge the state of usage of the one location indicated by the one memory address based on the corresponding piece of usage information.

According to the above structure, the processor provided with the address conversion unit can specify in advance whether or not the control unit needs to judge the state of usage of the predetermined location indicated by the one memory address.

(5) Here, the memory area may be further shared by a thread that is different from said another thread, and the control unit may further (i) perform execution of another read instruction included in the different thread to read the data stored in the memory area when the usage information indicates that writing into the memory area during execution of the one thread has been completed, and (ii) suppress execution of said another read instruction when the usage information indicates that writing into the memory area during execution of the one thread has not been completed.

According to the above structure, even when executing the read instruction to read the memory area shared with the plurality of threads after a plurality of instructions have been executed, the processor can execute the read instruction while maintaining the dependency relationship.

(6) Here, the processor may further comprise an address conversion unit configured to (i) convert a virtual address to a physical address, the virtual address being received when an instruction is fetched and (ii) notify the permission unit of request information for requesting the permission unit to perform a judgment, when the physical address is related to the value of the program counter prestored in the storage area, and the permission unit may perform the judgment when receiving the request information from the address conversion unit.

According to the above structure, the processor can specify in advance whether or not the permission unit needs to perform judgment, by including the address conversion unit.

(7) Here, when setting the usage information to indicate that writing into the memory area during execution of the one thread has been completed, the setting unit may further set another piece of usage information to indicate that writing into the memory area during execution of the one thread has been completed, said another piece of usage information being managed by another processor.

According to the above structure, the processor can perform processing while maintaining the dependency relationship according to which the read instruction is executed after a plurality of write instructions have been executed among other processors.

(8) Here, the one thread and said another thread may be for decoding the images, and the processor may be provided in an image processing system that decodes images.

According to the above structure, the processor can perform decoding processing while maintaining a dependency relationship according to which the read instruction is executed after a plurality of write instructions have been executed.

(9) Here, the one thread and said another thread may be for encoding the images, and the processor may be provided in an image processing system that encodes images.

According to the above structure, the processor can perform encoding processing while maintaining a dependency relationship according to which the read instruction is executed after a plurality of write instructions have been executed.

(10) One Embodiment of the present invention is an image processing apparatus comprising: a setting unit configured to set, when an instruction that exists at a location ensuring that writing into a memory area has been completed is executed, usage information indicating whether or not writing into the memory area has been completed such that the usage information indicates that writing into the memory area during execution of one thread has been completed, the memory area being shared among the one thread and another thread, the instruction being included in the one thread; and a control unit configured to (i) perform execution of a read instruction included in said another thread to read data stored in the memory area when the usage information indicates that writing into the memory area during execution of the one thread has been completed, and (ii) suppress execution of the read instruction when the usage information indicates that writing into the memory area during execution of the one thread has not been completed.

According to the above structure, by executing the instruction that exists at the location ensuring writing into the memory area shared with the another thread during execution of the one thread has been completed, the image processing apparatus reads data stored in the memory area during execution of the another thread. That is, the image processing apparatus ensures that instructions that exist up to the instruction that exists at the location have been executed, and after that, the processor can read the data stored in the memory area during execution of the another thread. Thereby, the image processing apparatus can maintain a dependency relationship for executing the read instruction after a plurality of write instructions have been executed, for example.

(11) Here, the image processing apparatus may decode an encoded image, macro blocks may be allocated to the plurality of threads so that the allocated macro blocks differ from one another, the macro blocks being arranged continuously in the encoded image, the instruction that exists at the location ensuring that writing into the memory area has been completed may indicate that one of variable length decoding processing, processing pertaining to inverse quantization and inverse frequency transformation, processing pertaining to motion compensation, reconfiguration processing of the image, and deblocking filter processing has been completed, and when judging that writing performed in the one processing has been completed in one of the macro blocks, the control unit may control the same processing as the one processing to be performed in a next macro block that immediately follows the one macro block.

According to the above structure, the image processing apparatus can perform decoding while maintaining dependency relationships among macroblocks that are continuously arranged.

(12) Here, the image processing apparatus may encode the image, macro blocks may be allocated to the plurality of threads so that the allocated macro blocks differ from one another, the macro blocks being arranged continuously in the encoded image, the instruction that exists at the location ensuring that writing into the memory area has been completed may indicate that one of subtraction processing for calculating a prediction error of image data that is targeted for encoding, quantizing processing for performing quantization and frequency transformation on the prediction error, encoding processing, generation processing of a reference image, and processing pertaining to motion compensation has been completed, and when judging that writing performed in the one processing has been completed in one of the macro blocks, the control unit may control the same processing as the one processing to be performed in a next macro block that immediately follows the one macro block.

According to the above structure, the image processing apparatus can perform encoding while maintaining dependency relationships among the macroblocks that are continuously arranged.

INDUSTRIAL APPLICABILITY

The multi-thread processor pertaining to the present invention includes a function for realizing flexible and high-performance operation, and accordingly can be used for a multi-thread processor and the like that perform media processing of video or audio of a DVD recorder, a digital TV, and the like.

REFERENCE SIGNS LIST 100 multi-thread processor
101 instruction memory
102 instruction fetch control unit
103 instruction group determining unit
104 first instruction buffer
105 second instruction buffer
106 $N^{th}$ instruction buffer
107 issued instruction determining unit
108 priority determining unit
109 first register file
110 second register file
111 $N^{th}$ register file
112 calculator group
113 write back bus
114 update control unit
115 data memory
116 read detecting unit
117 instruction detecting unit
118 management table storage unit
120 memory access
300 table read control unit
301 dep_id selecting unit
302 PC comparing unit
400 table read control unit
401 dep_id selecting unit
402 Read address comparing unit
403 comparing unit
404 adder

The invention claimed is:

1. A processor that executes a plurality of threads, the processor comprising:
a register configured to store, in association, an instruction address, a data address, and usage information indicating whether or not writing into a memory area has been completed;
a setting unit configured to monitor a fetch address of an instruction fetch in one thread, and when the fetch address matches the instruction address stored in the register, update the usage information stored in the register with a value indicating that writing into the memory area has been completed;
a control unit configured to monitor a read address for execution of a read instruction of another thread, and when the read address matches the data address stored in the register, suppress execution of the read instruction when the usage information stored in the register indicates that writing into the memory area has not been completed; and
an address conversion unit configured to convert a virtual address to a physical address, the virtual address being received when the data is read, wherein
when converting the virtual address, the address conversion unit determines whether or not a read address check flag of the virtual address is ON, and
the control unit performs monitoring pertaining to the read instruction only when the address conversion unit has determined that the read address check flag is ON.

2. The processor of claim 1, wherein
the control unit further configured to monitor a different read address for execution of a different read instruction of a different thread than the other thread, and when the different read address matches the data address stored in the register to suppress execution of the read instruction when the usage information stored in the register indicates that writing into the memory area has not been completed.

3. The processor of claim 1, wherein
when converting the virtual address, the address conversion unit determines whether or not a fetch address check flag of the virtual address is ON, and
the control unit performs monitoring pertaining to the instruction fetch only when the address conversion unit has determined that the fetch address check flag is ON.

4. The processor of claim 1, wherein
when updating the usage information to indicate that writing into the memory area has been completed, the setting unit further sets another piece of usage information to indicate that writing into the memory area has been completed, the other piece of usage information being managed by another processor.

5. The processor of claim 1 provided in an image processing system that decodes images, wherein
the one thread and the other thread are for decoding the images.

6. The processor of claim 1 provided in an image processing system that encodes images, wherein
the one thread and the other thread are for encoding the images.

7. The processor of claim 1, wherein
the processor is connected to an instruction memory and to a data memory that is distinct from the instruction memory, the instruction fetch is processing of fetching an instruction from the instruction memory, and the read instruction is an instruction of fetching data from the data memory.

8. A control method used in a processor that executes a plurality of threads, the processor including a register, the control method comprising:

storing, in the register and in association, an instruction address, a data address, and usage information indicating whether or not writing into a memory area has been completed;

monitoring a fetch address of an instruction fetch in one thread, and when the fetch address matches the instruction address stored in the register, updating the usage information stored in the register with a value indicating that writing into the memory area has been completed;

monitoring a read address for execution of a read instruction of another thread, and when the read address matches the data address stored in the register, suppressing execution of the read instruction when the usage information stored in the register indicates that writing into the memory area has not been completed; and converting a virtual address to a physical address, the virtual address being received when the data is read, and determining whether or not a read address check flag of the virtual address is ON, wherein monitoring pertaining to the read instruction is performed only when the read address check flag is determined to be ON.

9. An image processing apparatus that processes an image by using a plurality of threads, the image processing apparatus comprising:

a register configured to store, in association, an instruction address, a data address, and usage information indicating whether or not writing into a memory area has been completed;

a setting unit configured to monitor a fetch address of an instruction fetch in one thread, and when the fetch address matches the instruction address stored in the register, update the usage information stored in the register with a value indicating that writing into the memory area has been completed;

a control unit configured to monitor a read address for execution of a read instruction of another thread, and when the read address matches the data address stored in the register, suppress execution of the read instruction when the usage information stored in the register indicates that writing into the memory area has not been completed; and an address conversion unit configured to convert a virtual address to a physical address, the virtual address being received when the data is read, wherein when converting the virtual address, the address conversion unit determines whether or not a read address check flag of the virtual address is ON, and the control unit performs monitoring pertaining to the read instruction only when the address conversion unit has determined that the read address check flag is ON.

10. The image processing apparatus of claim 9 that decodes an encoded image, wherein macroblocks are allocated to the plurality of threads so that the allocated macroblocks differ from one another, the macroblocks being arranged continuously in the encoded image, the instruction address stored in the register is an address at which an instruction is stored that indicates that one of variable length decoding processing, processing pertaining to inverse quantization and inverse frequency transformation, processing pertaining to motion compensation, reconfiguration processing of the image, and deblocking filter processing has been completed, and when judging that writing performed in the one processing has been completed in one of the macroblocks, the control unit controls the same processing as the one processing to be performed in a next macroblock that immediately follows the one macroblock.

11. The image processing apparatus of claim 9 that encodes the image, wherein macroblocks are allocated to the plurality of threads so that the allocated macroblocks differ from one another, the macroblocks being arranged continuously in the encoded image, the instruction address stored in the register is an address at which an instruction is stored that indicates that one of subtraction processing for calculating a prediction error of image data that is targeted for encoding, quantizing processing for performing quantization and frequency transformation on the prediction error, encoding processing, generation processing of a reference image, and processing pertaining to motion compensation has been completed, and when judging that writing performed in the one processing has been completed in one of the macroblocks, the control unit controls the same processing as the one processing to be performed in a next macroblock that immediately follows the one macroblock.

* * * * *